United States Patent
Edwards et al.

(10) Patent No.: US 10,373,258 B2
(45) Date of Patent: Aug. 6, 2019

(54) SYSTEM FOR DETERMINATION OF DYNAMIC USER INTERFACES AND SELECTIVE CALCULATIONS

(71) Applicant: HARTFORD FIRE INSURANCE COMPANY, Hartford, CT (US)

(72) Inventors: Paul J. Edwards, West Hartford, CT (US); Erik Philip Mumbert, El Dorado Hills, CA (US); Karen A. Shaffer, Orange City, FL (US)

(73) Assignee: Hartford Fire Insurance Company, Hartford, CT (US)

( * ) Notice: Subject to any disclaimer, the term of this patent is extended or adjusted under 35 U.S.C. 154(b) by 483 days.

(21) Appl. No.: 14/707,249

(22) Filed: May 8, 2015

(65) Prior Publication Data

US 2016/0328799 A1    Nov. 10, 2016

(51) Int. Cl.
 G06Q 40/08    (2012.01)
 G06Q 10/10    (2012.01)

(52) U.S. Cl.
 CPC .......... *G06Q 40/08* (2013.01); *G06Q 10/105* (2013.01); *G06Q 10/1057* (2013.01)

(58) Field of Classification Search
 None
 See application file for complete search history.

(56) References Cited

U.S. PATENT DOCUMENTS

| | | | |
|---|---|---|---|
| 8,024,670 B1 | 9/2011 | Rahmatian et al. | |
| 8,112,333 B2 | 2/2012 | Walker et al. | |
| 2002/0065831 A1* | 5/2002 | DePaolo | G06F 17/243 |
| 2002/0184148 A1 | 12/2002 | Kahn et al. | |
| 2010/0049565 A1* | 2/2010 | Aebig | G06F 17/246 705/7.28 |
| 2010/0094666 A1 | 4/2010 | Pendergrass et al. | |
| 2010/0250297 A1* | 9/2010 | Channabasavaiah | G06Q 10/06 705/70 |
| 2011/0209042 A1* | 8/2011 | Porter | G06Q 10/087 715/212 |
| 2012/0010907 A1* | 1/2012 | Doelling | G06Q 40/02 705/4 |
| 2012/0010908 A1 | 1/2012 | Doelling et al. | |
| 2012/0102026 A1 | 4/2012 | Fortune | |

OTHER PUBLICATIONS

"Database Spreadsheet and Web Software built to meet the needs of your business", Software Matters, Feb. 26, 2015 Archive, Internet Archive Wayback Machine, <https://web.archive.org/web/20150226004436/http://www.software-matters.co.uk/microsoft-excel-benefits.html> (Year: 2015).*

* cited by examiner

*Primary Examiner* — Eric T Wong
(74) *Attorney, Agent, or Firm* — Howard IP Law Group

(57) ABSTRACT

A computer system for efficient processing of rules-based data. Computer-readable instructions cause one or more processors to generate one or more user interface displays including prompts for data indicative of employee data and jurisdiction; based on user inputs received in response, generate questions; based on responses to the questions and jurisdiction data, determine pay periods with prompts for employee wage data for each of the pay periods; determine gross wages in response to received employee wage data; determine average weekly wage data based on determined gross wages, and generate one or more formatted state forms including wage and average weekly wage data.

13 Claims, 26 Drawing Sheets

PAY PERIOD FREQUENCY: BI-WEEKLY 402

| PAY PERIOD 404 | | WAGE VALUES 408 | | | | |
|---|---|---|---|---|---|---|
| BEGIN DATE | END DATE | REGULAR HOURS | OVERTIME HOURS | DOUBLE TIME HOURS | HOURLY RATE | OTHER WAGES | GROSS EARNINGS |
| 07/15/2015 | 07/28/2015 | 40 | 2 | 0 | 10.00 | 0 | 430.00 |
| 07/29/2015 | 08/11/2015 | 40 | 0 | 0 | 10.00 | 0 | 400.00 |
| 08/12/2015 | 08/25/2015 | 40 | 0 | 2 | 10.00 | 0 | 440.00 |
| 08/26/2015 | 09/08/2015 | 40 | 0 | 0 | 11.00 | 0 | 440.00 |

AVERAGE WEEKLY WAGES: XXX.XX  412

FIG. 4

EMPLOYEE NAME: MS. SMITH
CLAIM NUMBER: C12345
DATE OF LOSS: 09/09/2015
DATE OF HIRE: 7/30/2015
_502_

PAY PERIOD FREQUENCY: BI-WEEKLY

| PAY PERIOD | | WAGE VALUES | | | | |
|---|---|---|---|---|---|---|
| BEGIN DATE | END DATE | REGULAR HOURS | OVERTIME HOURS | DOUBLE TIME HOURS | HOURLY RATE | OTHER WAGES | GROSS EARNINGS |
| 07/15/2015 | 07/28/2015 | 40 | 2 | 0 | 10 | 0 | 430 |
| 07/29/2015 | 08/11/2015 | 40 | 0 | 0 | 10 | 0 | 400 |
| 08/12/2015 | 08/25/2015 | 40 | 0 | 2 | 10 | 0 | 440 |
| 08/26/2015 | 09/08/2015 | 40H | 0 | 0 | 11 | 0 | 440 |

_504_

PLEASE CHECK "REGULAR HOURS" FOR 08/26/2015 TO 09/08/2015 (SHOULD ONLY CONTAIN NUMBERS)
_506_

AVERAGE WEEKLY WAGES: XXX.XX

| PAY PERIOD 606 | | WAGE VALUES 608 | | | | | |
|---|---|---|---|---|---|---|---|
| BEGIN DATE | END DATE | REGULAR HOURS | OVERTIME HOURS | DOUBLE TIME HOURS | HOURLY RATE | OTHER WAGES | GROSS EARNINGS |
| 07/16/2016 | 07/28/2016 | 40 | 0 | 0 | 11 | 0 | 440 |
| 07/29/2016 | 08/11/2016 | 40 | 0 | 0 | 11 | 0 | 440 |
| 08/12/2016 | 08/26/2016 | 40 | 0 | 0 | 11 | 0 | 440 |
| 08/26/2016 | 09/08/2016 | 40 | 0 | 0 | 11 | 30 | 470 |

| | |
|---|---|
| DID EMPLOYEE RECEIVE ONE (1) OR MORE BONUSES? | N |
| DID EMPLOY RECEIVE OTHER COMPENSATION (MEALS, ETC.)? | Y |
| DID HOURLY RATE CHANGE DURING OVERALL PAY PERIOD? | N |

| EXCLUDE | PAY PERIOD BEGIN DATE | PAY PERIOD END DATE | REG HO... |
|---------|------------|----------|---|
| N | 08/15/2015 | 08/28/2015 | |
| N | 08/29/2015 | 09/11/2015 | |
| Y | 08/15/2015 | 08/25/2015 | |
| N | 08/26/2015 | 09/08/2015 | |

802

CH WAGE CALCULATION
Period Used: 01/01/15 through 04/07/15 [14.00 weeks]
Days within period: 98
Explanation of Period: The overall period submitted is 01/01/15 - 12/29/15, which equates to 52.00 weeks total. In review, the overall period submitted required adjustment(s) resulting in the exclusion of 38.00 week(s) [266 day(s)]. Excluded pay period(s) include: 04/08/15 - 12/29/15. Subsequently, the overall period used is 01/01/15 - 04/07/15 less excluded pay period(s), which equates to 14.00 weeks total [98 day(s)].

Benefit Calculations
Gross earnings within period: $6,860.00
AWW Calc: $6,860.00 / 14.00 weeks = $490.00
TTD Calc: $490.00 x 2/3 = $326.67
$326.67 / 7 days = $46.67
Explanation of Calculations: The submitted hourly rate did NOT change within the overall period used, thus the hourly rate for all pay periods is $12.25. Proposed rates are based on appropriate totals and calculations as outlined above.

Proposed Rates
AWW: $490.00
TTD Rate: $326.67
Daily Rate: $46.67

Note: CH requested wage validation from TL on 04/20/15

PASSWORD: XXXXXXXX

| WAGE STATEMENT ID 1002 | PAY PERIOD 1004 | EXCLUDE 1006 | WAGE VALUES 1008 | GROSS WAGES 1010 |
|---|---|---|---|---|
| WS_101 | 07/15/2015 TO 07/28/2015 | N | 40 REG HRS; 2 OT HRS (10.00/HR) | 430.00 |
| WS_101 | 07/29/2015 TO 08/11/2015 | N | 40 REG HRS (10.00/HR) | 400.00 |
| WS_101 | 08/12/2015 TO 08/25/2015 | Y | 40 REG HRS; 2 2X HRS (10.00/HR) | 440.00 |
| WS_101 | 08/26/2015 TO 09/08/2015 | N | 40 REG HRS (11.00/HR) | 440.00 |

| WALT STRUCTURED DATA | | | |
|---|---|---|---|
| Field | Field_Value | | Filed_Te |
| Dropdown [State] | 16 | | |
| <None> | 1 | | |
| Used | 16 | | |
| Dropdown [Ascend/Descend] | 1 | | |
| Dropdown [Frequency] | 5 | | |
| <None> | 1 | | |
| Used | 5 | | |
| Dropdown [Calculate] | 3 | | |
| State | IL | | |
| OP_Unit | Weeks | | |
| #OP_Units | 52 | | |
| #OPUNIT[In Days] | 364 | | |
| #Min_Days | NA | | |
| Frequency_Lock | <None> | | |
| OT_DyHrlyThreshold | 0.00 | | |
| OT_WkHrlyThreshold | 40.00 | | |
| OT_x | 1.50 | | |
| OT_x_Used | 1.50 | | Employe |
| OT_x_Adjustment_Y/N | Yes | | |
| OT_DyHrlyThreshold | 0.00 | | |
| OT_WkHrlyThreshold | 0.00 | | |
| OT_x | 1.00 | | |
| HourlyRate | Yes | | |
| RegularHours | Yes | | |
| OvertimeHours | Yes | | |
| DoubletimeHours | No | | |
| ScheduledDaysPaid | Yes | | |
| ScheduledDaysUnpaid | Yes | | |
| PlaceHolder1 | No | | |
| PlaceHolder2 | No | | |
| Show[Derive] | OthWgs[GrssEarns] | | |
| date of hire > pay period start date | Soft | | |
| date of loss < pay period stop date | Soft | | |
| pay period start date > 52 weeks prior to date of loss | Soft | | |
| total hours < | <None> | | |
| total hours < X[X] | | | |
| days worked < | <None> | | |
| days worked < X[X] | | | |
| gross earnings = $0.00 | <None> | | |
| gross earnings anomily | <None> | | |
| place holder 1 | | | |
| place holder 2 | | | |
| place holder 3 | | | |
| hourly rate increase | Hard | | |
| Increase_Rate_Applied to Employee Only_Same Job | <None> | | |
| Increase_Rate_Applied to Employee Only_New Job | Exclude PPs Prior to Change | | |
| Increase_Rate_SelectEmployees | <None> | | |
| Increase_Rate_AllEmployees | <None> | | |

*Fig. 12*

| CODE [EMPLOYER & ADJUSTER NOTE] | | CODE [CALC & FILE NOTE] | | |
|---|---|---|---|---|
| State | Display_Orde | Employer/Adjuster_Text | State | AWW/AMW_Ca | AWW_Text |
| <All> | 1 | | NC | $369.38 | GROSS EARNINGS USED |
| <All> | 2 | | CO | $0.00 | AWW: $0.00TOTAL WAGE |
| <All> | 3 | | IL | $368.56 | GROSS EARNINGS USED |
| <All> | 4 | | NY | $400.16 | USED: $19,207.50 |
| <All> | 5 | | CA | | |
| <All> | 6 | | | | |
| <All> | 7 | | | | |
| <All> | 8 | | | | |
| <All> | 9 | | | | |
| IL | 1 | | | | |

*Fig. 13*

| CHANGE PASSWORD | 1Hartford | | | | | | | | | DISPLAY CONTROLS [USER INT] | | | |
|---|---|---|---|---|---|---|---|---|---|---|---|---|---|
| | | OVERALL PERIOD RULES | | | OVERTIME & DOUBLETIME STATE RULES | | | | | | | | |
| # | STATE | OP_Unit | #OP_Units | #Min_Days | Frequency_Lock | OT_DyHrlyThreshold | OT_WkHrlyThreshold | OT_x | DT_DyHrlyThreshold | DT_WkHrlyThreshold | DT_x | Hourly Rate | Regular Hours | Overtime Hours | Doublet Hour |
| 1 | <None> | | | | | | | | | | | $0.00 | 0.00 | 0.00 | 0.00 |
| 2 | AK | Years | 1 | | | 8.00 | 40.00 | 1.50 | 0.00 | 0.00 | 0.00 | | | | |
| 3 | AL | | | | | 0.00 | 0.00 | 0.00 | 0.00 | 0.00 | 0.00 | | | | |
| 4 | AR | | | | | 0.00 | 0.00 | 0.00 | 0.00 | 0.00 | 0.00 | | | | |
| 5 | AZ | | | | | 0.00 | 40.00 | 1.50 | 0.00 | 0.00 | 0.00 | | | | |
| 6 | CA | Weeks | 52 | | | 8.00 | 40.00 | 1.50 | 12.00 | 0.00 | 2.00 | Yes | No | No | No |
| 7 | CO | Weeks | 52 | | | 12.00 | 40.00 | 1.50 | 0.00 | 0.00 | 0.00 | No | No | No | No |
| 8 | CT | | | | | 0.00 | 40.00 | 1.50 | 0.00 | 0.00 | 0.00 | | | | |
| 9 | DC | | | | | 0.00 | 40.00 | 1.50 | 0.00 | 0.00 | 0.00 | | | | |
| 10 | DE | | | | | 0.00 | 0.00 | 0.00 | 0.00 | 0.00 | 0.00 | | | | |
| 11 | FL | | | | | 0.00 | 0.00 | 0.00 | 0.00 | 0.00 | 0.00 | | | | |
| 12 | GA | | | | | 0.00 | 0.00 | 0.00 | 0.00 | 0.00 | 0.00 | | | | |
| 13 | HI | | | | | 0.00 | 40.00 | 1.50 | 0.00 | 0.00 | 0.00 | | | | |
| 14 | IA | | | | | 0.00 | 0.00 | 0.00 | 0.00 | 0.00 | 0.00 | | | | |
| 15 | ID | | | | | 0.00 | 0.00 | 0.00 | 0.00 | 0.00 | 0.00 | | | | |
| 16 | IL | Weeks | 52 | | | 0.00 | 40.00 | 1.50 | 0.00 | 0.00 | 0.00 | Yes | Yes | Yes | No |
| 17 | IN | | | | | 0.00 | 40.00 | 1.50 | 0.00 | 0.00 | 0.00 | | | | |
| 18 | KS | | | | | 0.00 | 46.00 | 1.50 | 0.00 | 0.00 | 0.00 | | | | |
| 19 | KY | | | | | 0.00 | 40.00 | 1.50 | 0.00 | 0.00 | 0.00 | | | | |
| 20 | LA | | | | | 0.00 | 0.00 | 0.00 | 0.00 | 0.00 | 0.00 | | | | |
| 21 | MA | | | | | 0.00 | 40.00 | 1.50 | 0.00 | 0.00 | 0.00 | | | | |
| 22 | MD | | | | | 0.00 | 40.00 | 1.50 | 0.00 | 0.00 | 0.00 | | | | |
| 23 | ME | | | | | 0.00 | 40.00 | 1.50 | 0.00 | 0.00 | 0.00 | | | | |
| 24 | MI | | | | | 0.00 | 40.00 | 1.50 | 0.00 | 0.00 | 0.00 | | | | |
| 25 | MN | | | | | 0.00 | 48.00 | 1.50 | 0.00 | 0.00 | 0.00 | | | | |
| 26 | MO | | | | | 0.00 | 40.00 | 1.50 | 0.00 | 0.00 | 0.00 | | | | |
| 27 | MS | | | | | 0.00 | 0.00 | 0.00 | 0.00 | 0.00 | 0.00 | | | | |
| 28 | MT | | | | | 0.00 | 40.00 | 1.50 | 0.00 | 0.00 | 0.00 | | | | |
| 29 | NC | Weeks | 52 | | Monthly | 0.00 | 0.00 | 0.00 | 0.00 | 0.00 | 0.00 | No | No | No | No |

Fig. 19 wait ™

THE HARTFORD  IL ◄▶

Feb 06 2015  4:42 PM
Save
Email  Reset
Print Options

Employer Name: ABC Company
Employee Name: Joe Claimant
Date of Hire: 01/01/2010    Date of Loss: 05/15/2014
Claim Number: YMC123456    Order: Asc ▶
Pay Frequency: Monthly ▶
52 Weeks Prior to Loss: 05/16/2013
OT [1.50xPay]

Employment status change during overall period?
Hourly rate increase applied to?
Other Wages include bonuses or fringe benefits?
Employee is a teacher?
Current employment status?
Overtime hours are mandatory or not mandatory?
Number of days the employee may work per week?
Populate ◄▶ | Gross Earnings ▶ | Calculate Length of Employment: 162.29 weeks [1,136 days]
Pay Period Count: 13
Period Range: 05/16/13-05/14/14 [164 days]
Total Period: 52.00 weeks [364 days]
Hourly Rate: Increased from $8.00 to $9.00
Total Regular Hours: 1,920.00
Total Overtime Hours: 10.00
Total Scheduled Days Paid: 240
Total Other Wages: $3,000.00
Total Gross Earnings: $19,207.50

— 2005

— 2030

| | Pay Period Start Date | Pay Period Stop Date | Hourly Rate | Regular Hours | Overtime Hours | Scheduled Days Paid | Scheduled Days Unpaid | Other Wages | Gross Earnings |
|---|---|---|---|---|---|---|---|---|---|
| 16Days | 05/15/13 | 05/31/13 | $8.00 | 80.00 | | 10 | | | $640.00 |
| 30Days | 06/01/13 | 06/30/13 | $8.00 | 160.00 | 2.00 | 20 | | | $1,304.00 |
| 31Days | 07/01/13 | 07/31/13 | $8.00 | 160.00 | | 20 | | $3,000.00 | $4,280.00 |
| 31Days | 08/01/13 | 08/31/13 | $8.00 | 160.00 | | 20 | | | $1,280.00 |
| 30Days | 09/01/13 | 09/30/13 | $8.00 | 160.00 | 3.00 | 20 | | | $1,316.00 |
| 31Days | 10/01/13 | 10/31/13 | $8.00 | 160.00 | | 20 | | | $1,280.00 |
| 30Days | 11/01/13 | 11/30/13 | $8.00 | 160.00 | | 20 | | | $1,280.00 |
| 31Days | 12/01/13 | 12/31/13 | $9.00 | 160.00 | | 20 | | | $1,440.00 |
| 31Days | 01/01/14 | 01/31/14 | $9.00 | 160.00 | | 20 | | | $1,440.00 |
| 28Days | 02/01/14 | 02/28/14 | $9.00 | 160.00 | 5.00 | 20 | | | $1,507.50 |
| 31Days | 03/01/14 | 03/31/14 | $9.00 | 160.00 | | 20 | | | $1,440.00 |
| 30Days | 04/01/14 | 04/30/14 | $9.00 | 160.00 | | 20 | | | $1,440.00 |
| 14Days | 05/01/14 | 05/14/14 | | 80.00 | | 10 | | | $720.00 |

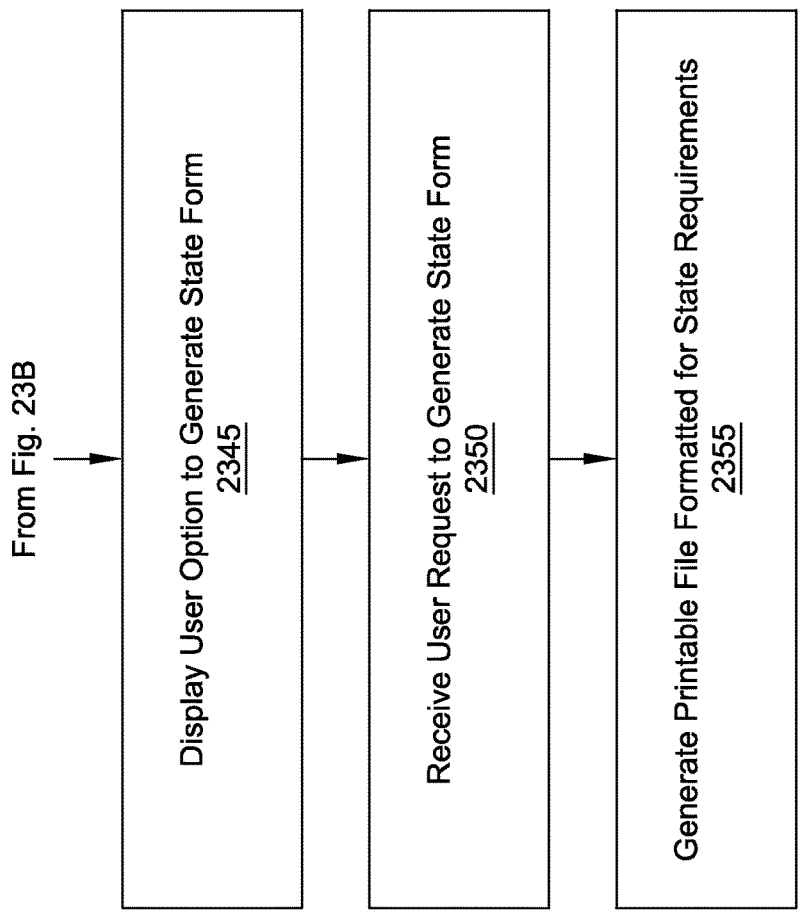

SYSTEM FOR DETERMINATION OF DYNAMIC USER INTERFACES AND SELECTIVE CALCULATIONS

CROSS-REFERENCE TO RELATED APPLICATIONS

This application is related to copending U.S. patent application Ser. No. 13/524,189, filed Jun. 15, 2012, the entirety of which is incorporated herein by reference for all purposes.

FIELD

Embodiments relate to data processing systems for generation of dynamic user interfaces and related calculation capabilities with efficiencies.

BACKGROUND

In some cases, an individual may be entitled to receive insurance benefits based at least in part on past wages that he or she has earned. For example, an injured worker might receive workers' compensation payments from an insurance company based on his or her average weekly wages over the prior year. To submit information about past wages to an insurance company, an injured worker or an employer representative, such as an employee in a human relations department of an employer, might provide copies of old paychecks, screenshots taken from a payroll accounting system, and/or information manually entered by hand on an insurance form. A claim handler associated with the insurance company might then review the wage information and determine an appropriate benefit amount. Such a determination, however, can be difficult to perform in an accurate and consistent manner. For example, extended periods away from work, bonuses, and overtime pay may need to be accounted for by the claim handler. Moreover, the appropriate way to handle these situations varies depending on the jurisdiction in which an injury occurred.

Individual jurisdictions have generated required paper forms on which information regarding the injured worker, including past wage information, must be submitted. The forms vary among jurisdictions as to format and required information.

In addition to average weekly wage information, individual state forms may require display of such information as gross earnings and other earnings. Calculations of these values may vary among jurisdictions, depending, for example, on rules governing rates for overtime and double time. These values are in turn employed in calculation of average weekly wage values. Errors in these values may result in rejection of filings of required forms.

As a result of variations in rules from jurisdiction to jurisdiction, required information and underlying formulas need to vary from jurisdiction to jurisdiction. Individual claim handlers and employer human resource departments may be responsible for injured workers in multiple jurisdictions. It would be desirable for capabilities for calculations and generation of suitable forms in multiple jurisdictions to be available without a need for separate application programs or for large programs that require extensive storage, transmission and memory resources.

A wide variety of options may be available for determination of pay periods. For example, different employers may use weekly, bi-weekly, monthly, semi-monthly and other pay periods. Accurate determinations of past pay period begin and end dates may be difficult as a result.

Note that penalties may be applied to an insurance company that fails to determine benefits in an accurate and consistent manner. For example, a state auditor might assess penalties, including interest penalties, when an insurance company fails to determine and/or document workers' compensation cases in an appropriate manner. Moreover, note that problems might arise from inconsistent and/or inaccurate wage statement data provided by an injured worker or an employer, inconsistent and/or inaccurate benefit calculations by a claim handler, or insufficient documentation about the benefit calculations in a claim file.

Systems and methods for improvements in processes relating to processing of workers compensation claims, including greater accuracy in determinations, while avoiding unnecessary burdens on computer processing resources, would be desirable.

SUMMARY

In embodiments, a computer system for efficient processing of rules-based data input via one or more user interfaces for determination of workers compensation benefits, includes: a memory device storing computer-readable instructions, which instructions, when executed by one or more processors executing a spreadsheet application program, cause the one or more processors to: generate a user interface display comprising prompts for data indicative of responses to one or more questions, claim data and injured worker data, the one or more questions being determined based on an applicable jurisdiction; based in part on responses to the one or more questions, generate prompts for input of responses to further questions and payroll date information; generate a display of payroll periods, based at least in part on the claim data and payroll date information, with prompts for input of wage data for the injured worker; receive user inputs of wage data; based on the received user inputs, via formulas embodied in the instructions, generate pay period gross wage data for the injured worker; based on the generated gross wage data, determine average weekly wage data for the injured worker; and responsive to determination of the average weekly wage data, generate a formatted state form incorporating the determined average weekly wage data for the injured worker.

In embodiments, a computer-implemented method for efficient processing of rules-based data input via a plurality of user interfaces, includes generating, by one or more processors executing a spreadsheet application program, accessing at least one computer-readable file defining a plurality of spreadsheet tables, a user interface display comprising prompts for data indicative of jurisdiction and employee data; receiving, via the user interface, user inputs of data indicative of jurisdiction and employee data; based on the received user inputs, via formulas embodied in one or more of the plurality of spreadsheet tables, determining, by the one or more processors executing the spreadsheet application program and accessing the plurality of spreadsheet tables, a plurality of pay periods, and prompting the user for wage information for each of the pay periods; determining, based on received wage information, gross wage amounts for each of the pay periods; based on the gross wage amounts, determining average weekly wage data, and generating a formatted state form incorporating the determined average weekly wage data.

In embodiments, a computer-implemented method for efficient processing of rules-based data input via a plurality of user interfaces includes generating, by one or more processors executing a spreadsheet application program, accessing at least one computer-readable file defining a plurality of spreadsheet tables; a user interface display comprising prompts for data indicative of jurisdiction and employee wage data; receiving, via the user interface, user inputs of data indicative of jurisdiction and employee wage data; based on the received user inputs, via formulas embodied in one or more of the plurality of spreadsheet tables, determining, by the one or more processors executing the spreadsheet application program and accessing the plurality of spreadsheet tables, a plurality of pay periods and gross wage amounts for each of the pay periods for at least one employee; responsive to determination of the pay periods and the gross wage amounts, determine average weekly wage data for the at least one employee, and generate a formatted state form incorporating the determined average weekly wage data for the at least one employee.

In embodiments, a non-transitory computer-readable medium having stored computer-readable instructions, in a spreadsheet format, comprising a plurality of spreadsheet tables, having internal references, which instructions, when executed by one or more processors executing a spreadsheet application program, cause the one or more processors to: receive inputs of jurisdiction and employee data; responsive to the inputs, generate displays of one or more questions; based on jurisdiction and responses, determine a plurality of pay periods, and generate displays of prompts for employee wage data for each of the pay periods; receive employee wage data, and generate gross wage data based on the received wage data; based on the gross wage data, determine average weekly wage data; and responsive to determination of the average weekly wage data, generate a formatted state form incorporating the determined average weekly wage data.

BRIEF DESCRIPTION OF THE DRAWINGS

FIG. 4 illustrates a wage statement according to some embodiments of the present invention.

FIG. 5 illustrates a wage statement incorporating error checking according to some embodiments of the present invention.

FIG. 6 illustrates a wage statement incorporating supplemental information according to some embodiments of the present invention.

FIG. 8 illustrates a wage statement that may be used to generate a file note according to some embodiments of the present invention.

FIG. 10 is a tabular portion of a wage statement database according to some embodiments.

FIG. 12 illustrates a portion of an exemplary structured data table in accordance with some embodiments.

FIG. 13 illustrates a portion of an exemplary spreadsheet table for banner guidance and calculations in accordance with some embodiments.

FIG. 14 illustrates a portion of an exemplary state configuration table in accordance with some embodiments.

FIG. 15 illustrates a portion of an exemplary reflexive question table in accordance with some embodiments.

FIG. 16 illustrates a user interface display including display of reflexive questions in accordance with some embodiments.

FIG. 17 illustrates a user interface display including display of reflexive questions and notes in accordance with some embodiments.

FIG. 19 illustrates a user interface display including pre-populated pay period data and associated data information.

FIG. 20 illustrates a user interface display including populated pay period data and determined gross earnings data.

FIGS. 23A-23C shows a flow diagram of a method according to some embodiments.

DETAILED DESCRIPTION OF EMBODIMENTS

Figure 1:
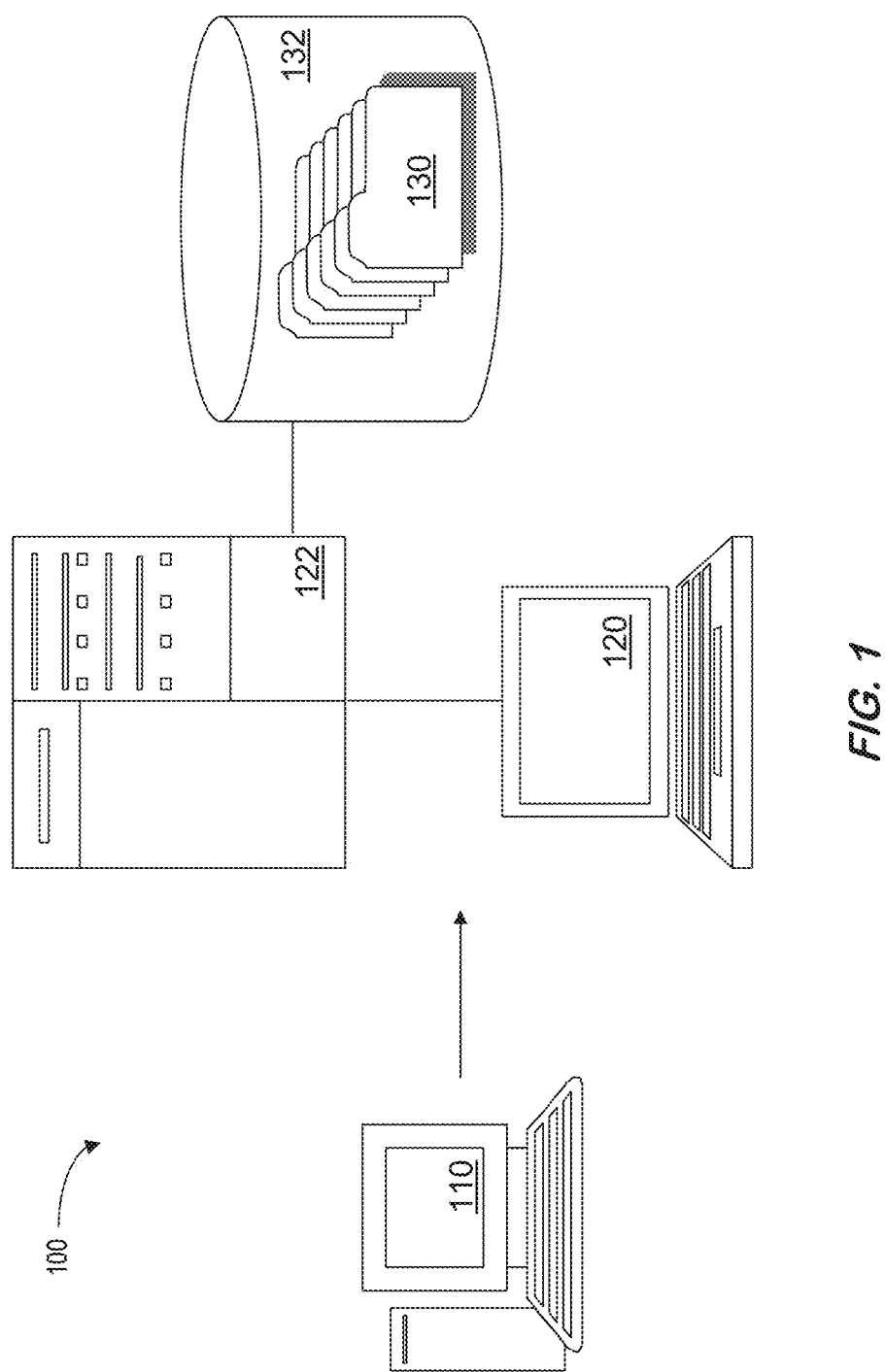
FIG. 1 illustrates block diagram of an insurance computing system according to some embodiments of the present invention.

Embodiments of the present disclosure relate to computer systems particularly configured to address challenges encountered in connection with computer-implementation of determination of values, including values such as average weekly wage values, in connection with determination of workers compensation benefits. Formulas for determination of average weekly wages vary depending on jurisdiction. Factors involved in formulas vary depending on jurisdiction. Required forms for presentation of average weekly wage data vary by jurisdiction. One approach to determination of average weekly wages is to provide a file having separate code for each jurisdiction for generation of appropriate questions, determination of average weekly wage data, generation of forms presenting average weekly wage data, and other necessary information. However, such a file would be large, presenting challenges in distribution for implementing on local user devices, as well as making use of substantial amounts of memory resources in devices configured to implement the instructions in the file.

In embodiments, these challenges are addressed by providing a file including a set of interrelated tables, including a structured data table, a banner guidance and average weekly wage calculation table, a state configuration table, and a reflexive question table. The tables may be implemented in formats compatible with any one of a number of spreadsheet application programs, such as Microsoft EXCEL®, and thereby leverage local program resources for execution. In many instances, employers, who may be small business entities relying on local computer systems having installed spreadsheet application programs, may wish to employ the system. The implementation via a file including a set of interrelated tables for use in connection with a spreadsheet program provides benefits in comparison to other implementations. For example, the file size is relatively compact, which facilitates distribution via e-mail, reduces download time for distribution via ftp server or third party system, and conserves the amount of disk space or other memory resources employed at the local user system. Users with administrative rights are able to configure rules, questions and other data in response to changes in rules in applicable jurisdictions, for example. The use of spreadsheet features for formatting of display elements permits instructions to be incorporated in a single file that is accessed by a spreadsheet application program, thereby simplifying execution, as opposed to alternatives, such as formatting display elements via a browser client.

In embodiments, methods and systems are configured to provide an interactive user interface prompting users for input of data in a format that is independent of formats of forms of individual jurisdictions. The user interface is configured by tables, such as the banner guidance and average weekly wage calculation table and the reflexive question table. A single table may include rules for differentially configuring user interfaces for different jurisdictions. Data entered via the user interface is processed by one or more tables, and the results are stored. The results may be accessed by a form generation module which, responsive to a user instruction received via a user interface, generates jurisdiction-specific forms including a presentation of the stored processed average weekly wage data.

In embodiments, the present computer system is configured to address challenges associated with accurate determination of intermediate values, such as gross earnings, overtime earnings, double time earnings, and other earnings, by deriving values including gross earnings and other earnings information based on values input via the user interface. The system may be configured to display fields for input of wage values for pay periods dependent on state rules, and to display calculated gross earnings information. The computer system is configured to perform calculations based on rules and formulas embodied in one or more tables to determine applicable crediting of overtime pay, and double time pay, by way of example, dependent on jurisdiction.

In embodiments, methods and systems are configured to populate pay periods according to user selectable options, including weekly, bi-weekly, semi-monthly, monthly and manual selection. Rules implemented in spreadsheets may consider factors such as dates of injury, hire date, maximum period required by state law, in order to obtain an accurate determination of relevant pay periods.

It will be understood that a workers compensation insurance policy is generally issued to an employer as the insured, and that injured workers are beneficiaries of benefits paid by an insurance company under such policies. An individual seeking to submit information about past wages may be an injured worker, a representative of an injured worker, a representative of an employer, or another person, and may be referred to as an "insured" herein for convenience.

Figure 2:
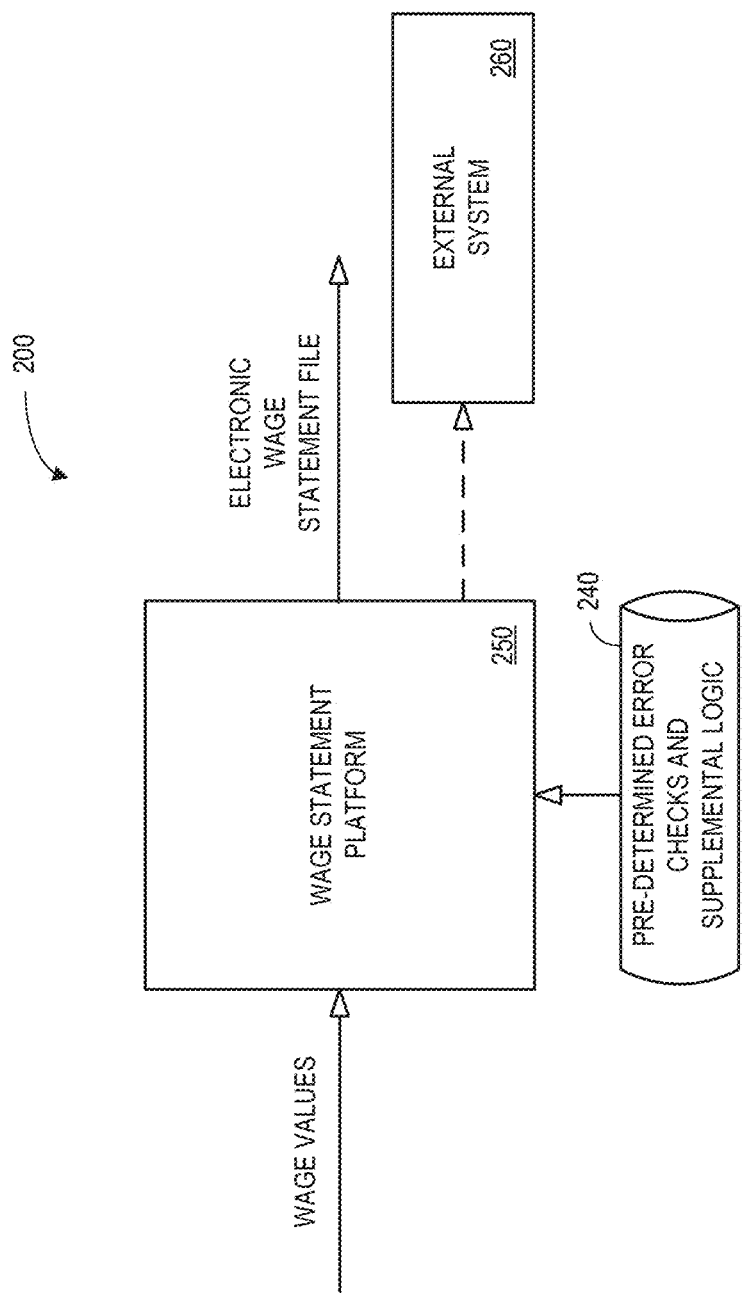
FIG. 2 is block diagram of a system according to some embodiments of the present invention.

FIG. 1 is block diagram of an insurance computing system 100 according to some embodiments of the present invention. In particular, an insured associated with an insured computing device 110 (e.g., a desktop computer, laptop computer, tablet computer, etc.) may be entitled to receive insurance benefits based at least in part on past wages that he or she has earned. For example, an injured worker might receive workers' compensation payments from an insurance company based on his or her average weekly wages over the prior year. To submit information about past wages to an insurance company, the insured computing device 110 might be used to provide copies of old paychecks, screenshots taken from a payroll accounting system, and/or information manually entered by hand on an insurance form. A claim handler computing device 120 associated with the insurance company might then be used to review the wage information, determine an appropriate benefit amount, and document his or her determination in a claim file 130 stored at a remote storage device 132 (e.g., via an intermediate insurance processing platform 122). Such a determination, however, can be difficult to perform in an accurate and consistent manner. For example, extended periods away from work, bonuses, and overtime pay may need to be accounted for by the claim handler. Moreover, the appropriate way to handle these situations can vary depending on the jurisdiction in which an injury occurred It would therefore be desirable to provide systems and methods to facilitate the workflow in an automated, efficient, and accurate manner. FIG. 2 is block diagram of a system 200 according to some embodiments of the present invention. In particular, the system 200 includes a wage statement platform 250 that receives wage values (e.g., from an insured). The wage statement platform 250 might be, for example, associated with a Personal Computers (PC), laptop computer, an enterprise server, a web server farm, and/or a database or similar storage devices. The wage statement platform 250 may, according to some embodiments, be associated with an insured, a business organization, or an insurance provider.

According to some embodiments, an "automated" wage statement platform 250 may facilitate generation of an electronic wage statement file. As used herein, the term "automated" may refer to, for example, actions that can be performed with little or no human intervention. The wage statement platform may, for example, help insureds submit appropriate wages, assist claim handlers to adjust submitted wages as warranted, and/or facilitate an automatic generation and/or posting of consistent and accurate file notes.

As used herein, devices, including those associated with the wage statement platform 250 and any other device described herein, may exchange information via any communication network which may be one or more of a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a wireless LAN network, and/or an Internet Protocol (IP) network such as the Internet, an intranet, or an extranet. Note that any devices described herein may communicate via one or more such communication networks.

The wage statement platform 250 may also access pre-determined error checks and supplemental logic 240. The pre-determined error checks and supplemental logic 240 might be associated with, for example, state laws and regulations. The pre-determined error checks and supplemental logic 240 may be locally stored or reside remote from the wage statement platform 250. As will be described further below, the pre-determined error checks and supplemental logic 240 may be used by the wage statement platform 250 along with the wage values to generate an accurate electronic wage statement file. According to some embodiments, the wage statement platform 250 communicates with an external system 260, such as by transmitting electronic wage statement information to an insurance provider platform, an email server, a workflow management system, etc.

Although a single wage statement platform 250 is shown in FIG. 2, any number of such devices may be included. Moreover, various devices described herein might be combined according to embodiments of the present invention. For example, in some embodiments, the wage statement platform 250 and pre-determined error checks and supplemental logic 240 might be co-located and/or may comprise a single apparatus.

Figure 3:
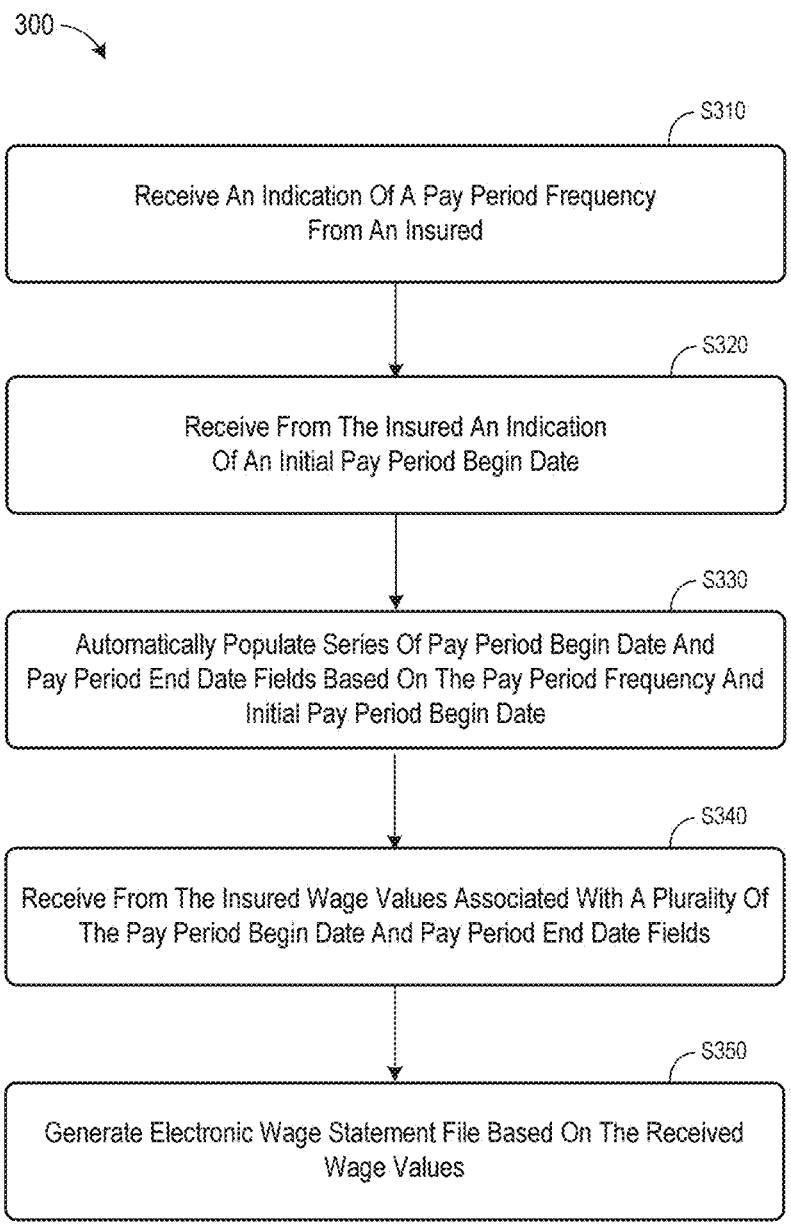
FIG. 3 illustrates a method according to some embodiments of the present invention.

FIG. 3 illustrates a method that might be performed, for example, by some or all of the elements of the system 200 described with respect to FIG. 2 according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S310, wage statement information may be received from an insured. For example, the insured might enter information into a spreadsheet application. According to some embodiments, the wage statement information may include an indication of a pay period frequency, such as an indication that the insured was paid on a monthly, bi-weekly, or weekly basis. According to some embodiments, the wage statement information and/or other information described herein may be received from another party associated with the insured (e.g., a family member or intermediate claim service). Other examples of wage statement information that might be received from the insured include: (i) an employee name, (ii) a claim number, (iii) a date of loss (e.g., associated with when an accident occurred or when a claim was submitted)), (iv) a date of hire, (v) period of employment information, and/or (vi) date of completion information (e.g., indicating when the insured provided the wage statement information).

At S320, an indication of an initial pay period begin date may be received from the insured. For example, the insured might indicate that he or she began working for a company on Jul. 15, 2015. At S330, a series of pay period begin date and pay period end date fields may be automatically populated based on the pay period frequency and initial pay period begin date. For example, cells in a spreadsheet application might be automatically populated with dates reflecting 52 weeks of bi-weekly pay periods.

At S340, wage values associated with a plurality of the pay period begin date and pay period end date fields may be received from the insured. For example, the insured might enter into spreadsheet cells some or all of the following information for each pay period: (i) a number of regular hours worked, (ii) a number of overtime hours worked, (iii) an hourly rate, and (iv) other wages.

At S350, an electronic wage statement file may be generated based on the received wage values. For example, a spreadsheet application might automatically compute a gross wages amount for each of the plurality of pay period begin date and pay period end date fields based on the wage values. Moreover, an average weekly wage amount might be automatically computed and documented for the electronic wage statement file. The average weekly wage amount can then be used to determine an appropriate benefit amount for the insured.

According to some embodiments, an insured might use a graphical user interface to provide wage information. For example, FIG. 4 illustrates a wage statement 400 according to some embodiments of the present invention. The wage statement 400 includes a pay period frequency selection 402 that can be used by an insured to indicate if he or she was paid on a monthly, bi-weekly, or weekly basis. Moreover, the statement 400 includes pay period data 404. Although only four pay periods 404 are illustrated in FIG. 4 note that a statement 400 may include any number of pay periods 404 (e.g., to account for a complete year of wage history). According to some embodiments, the insured enters a date into an initial pay period begin date 406 and the remaining cells of pay period data 404 are automatically populated based on that date and the pay period frequency 402 selected by the insured. The statement further includes wage values 408 that can be entered by the insured, such as a number of regular hours worked, overtime hours, double time hours, an hourly rate, and/or other wages (e.g., tips, bonuses, per diem payments, etc.).

Note that the pay period data 404 might be displayed in ascending order (with the initial pay period at the top of the list) or descending order (with the most recent pay period at the top of the list). Moreover, according to some embodiments, the insured may select a pay period frequency of "manual entry." In this case, the insured may define various begin dates and end dates for the pay period data 404. In this case, the system might automatically create a pay period to span any gap in the manually entered pay period data 404 along with a text-entry area that can be used to explain why no wage information is being submitted for that period.

According to some embodiments, an insured may manually define in a non-concurrent fashion. For example, a first pay period defined as Jan. 1, 2015-Jan. 15, 2015 might be followed by a second pay period defined as Jan. 25, 2015-Feb. 14, 2015 (note that there is a 9 day gap). In this case, an artificial pay period from Jan. 16, 2015-Jan. 24, 2015 might be automatically generated, the artificial pay period might be automatically excluded from an average weekly wages calculation, and a reason why the period was excluded might be automatically added to a file note. Thus, these types of gaps and/or errors may be taken into account when processing the overall benefit calculation, and an appropriate file note may be generated in a consistent fashion.

The wage statement 400 may use the wage values 408 for each pay period 404 to automatically calculate a gross earnings amount 410. For example, if a worker was paid $10.00 per hour, worked 40 regular hours and 2 overtime hours (for which he or she was paid time and a half), then the gross earnings 410 for that time period would be $430.00. The wage statement 400 may further include an average weekly wage 412 that is automatically calculated based on the insured's gross earnings 410 for each of the pay periods 404.

Thus, the wage statement 400 may facilitate administration of an insured and limit the likelihood of human error (e.g., a person incorrectly determining dates for bi-weekly pay periods or gross earning amounts). According to some embodiments, fields that require attention by the insured may be highlighted (e.g., displayed with a yellow background). Although pay periods 404 might be automatically populated with weekly or bi-weekly frequencies, according to some embodiments an insured might select to manually enter this information (e.g., in an ascending or descending order).

According to some embodiments, a wage statement platform may review wage information provided by an insured to detect inaccuracies or potential errors before the information is submitted to a claim handler. For example, FIG. 5 illustrates a wage statement 500 incorporating error checking according to some embodiments of the present invention. In particular, this wage statement 500 may be used to enter additional information 502, including an employee name, a claim number, a date of loss, and a date of hire. Note that additional information 502 may be used to adjust calculations performed in connection with, for example, an average weekly wage for the wage statement 500. Moreover, the additional information 502 and/or other data may be used to automatically perform an error check on the wage statement information received from the insured in accordance with a pre-determined error checking rule. For example, when non-numeric data is entered into certain cells of the wage statement 500, an alert or warning 506 may be displayed to the insured. The insured may then review the entered values and correct as appropriate.

According to some embodiments, a wage statement may dynamically adjust the information being displayed and/or entered by an insured. For example, FIG. 6 illustrates a wage statement 600 incorporating supplemental information 602 according to some embodiments of the present invention. The supplemental information 602 might include tips, hints, or questions that are dynamically determined and displayed based on wage statement information received from the insured. According to some embodiments, the supplemental information 602 includes logic-based selections wherein the context of the wage statement 600 entries can change what is shown to the insured. Moreover, different questions, helpful tips, and/or data entries fields may be displayed as appropriate (e.g., an insured who indicates that he or she was a seasonal employee might be asked to provide a start date and finish date for his or her wage statement 600). In this way, the wage statement 400 may constantly adjust and/or instruct an insured based on the input data and hide unneeded fields and/or questions as appropriate.

Figure 7:
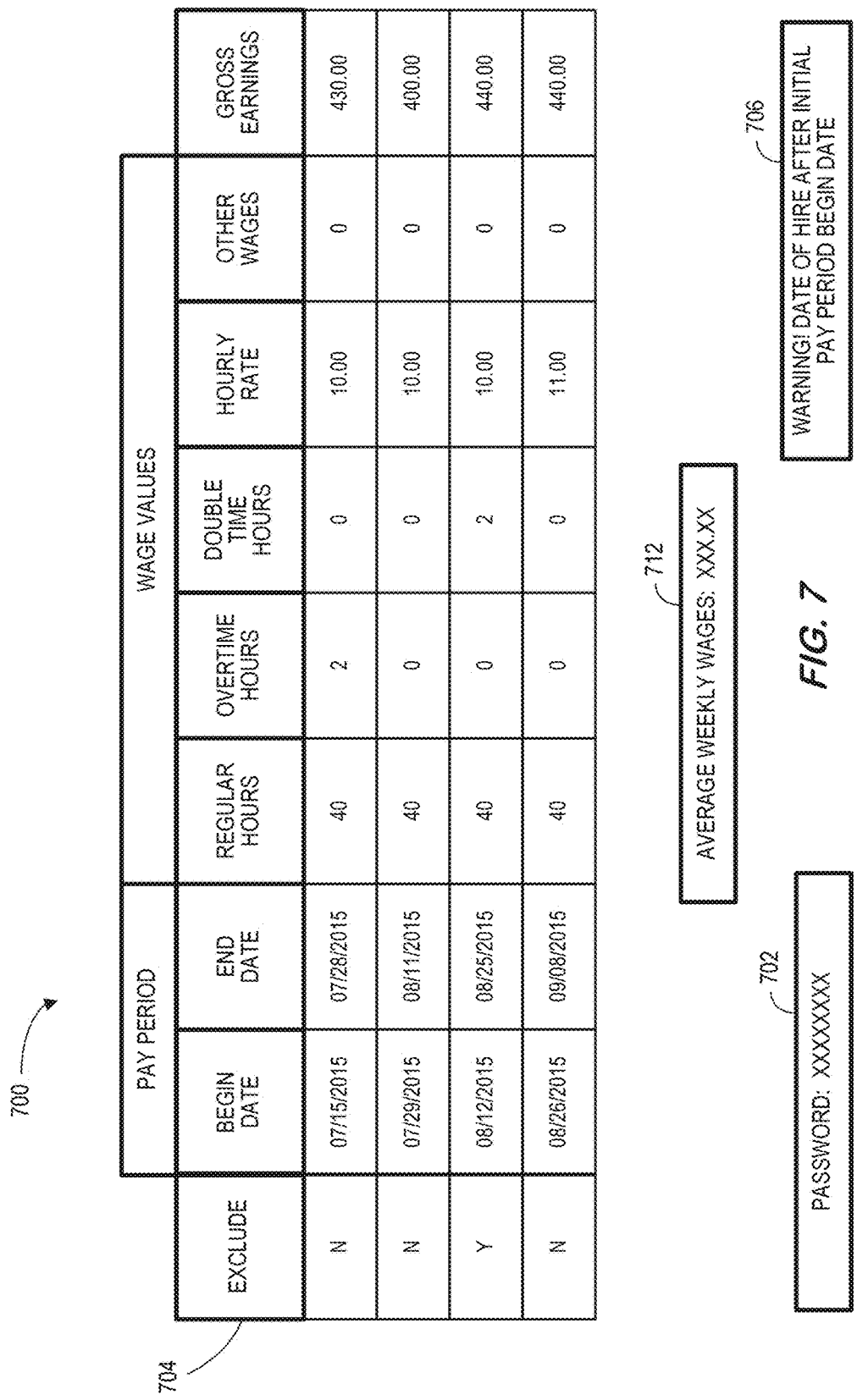
FIG. 7 illustrates a wage statement that may be accessed by a claim handler according to some embodiments of the present invention.

Thus, some embodiments described herein may facilitate an accurate and consistent entry of wage data by an insured. According to some embodiments, a wage statement may further be used by a claim handler to facilitate an accurate and consistent determination of benefits. For example, FIG. 7 illustrates a wage statement 700 that may be accessed by a claim handler according to some embodiments of the present invention. According to this embodiment, the wage statement 700 includes a password entry area 702 that can be used by a claim handler to provide his or her user name or other appropriate identifier. When the password is validated by the wage statement 700, additional information and/or data entry options may be provided. For example, indications of exclusion 704 for a sub-set of the plurality of pay period begin date and pay period end date fields may be provided by a claim handler (e.g., as illustrate in FIG. 7, the claim handler might indicate with a "Y" that wages from Aug. 12, 2015 through Aug. 25, 2015 should be excluded from benefit calculations). Based on the indications of exclusion 704, the wage statement 700 may automatically re-calculate an appropriate average weekly wage 712 for the insured. This additional layer of functionality may be built into a wage statement tool to allow a claim handler to make adjustments if warranted. After the tool is unlocked by entering a password, it may identify and alert the claim handler about various potential concerns, such as pay periods having start dates prior to date of hire, gross earnings being equal to zero, and/or pay periods having end dates after a date of loss. According to some embodiments, error checks may be performed for the claim handler. For example, when an initial pay period begin date is prior to an insured's date of hire, an alert or warning 706 may be displayed to the claim handler. The claim handler may then review the entered values and correct as appropriate.

According to some embodiments, computation of the average weekly wage 712 is performed in accordance with a workers' compensation rule engine. For example, the electronic wage statement 700 may be associated with one of a plurality of potential jurisdictions, and the workers' compensation rule engine may compute the average weekly wage 712 based on at least one of a minimum value and a maximum value applicable to that jurisdiction. For example, the wage statement 700 might have an identifier indicating that the injury is associated with California laws and regulations. In this case, a minimum average weekly wage value might automatically override some information in the wage statement. Similarly, according to some embodiments, a wage increase is automatically and retroactively applied to prior pay periods. For example, in the illustration of FIG. 7, the increase from $10.00 per hour to $11.00 per hour might be automatically applied to pay periods prior to Aug. 26, 2015 (again, perhaps depending on the jurisdiction associated with the wage statement).

In this way, the wage statement 700 may help a claim handler determine an appropriate benefit amount for an insured. According to some embodiments, a wage statement platform may also help ensure that such determinations are appropriately documented. For example, FIG. 8 illustrates a wage statement 800 that may be used to generate a detailed file note 802 according to some embodiments of the present invention. In particular, the file note 802 may be automatically generated based on wage information submitted by the insured as well as any adjustments made by the claim handler. The file note 802 may clearly document which periods/weeks were used, days within a period, and/or provide a detailed explanation of periods/adjustments. The file note 802 may also include a mathematical breakdown of benefit calculations, taking into account statutory minimum and/or maximum rates, and provide a detailed explanation of all calculations, overrides, and/or adjustments. The file note 802 may, according to some embodiments, conclude with a proposed benefit rate and prompt a claim handler to send the calculations to a team leader for validation. According to some embodiments, the file note 802 may be linked to, saved within, and/or be cut-and-paste into a claim file.

Figure 9:
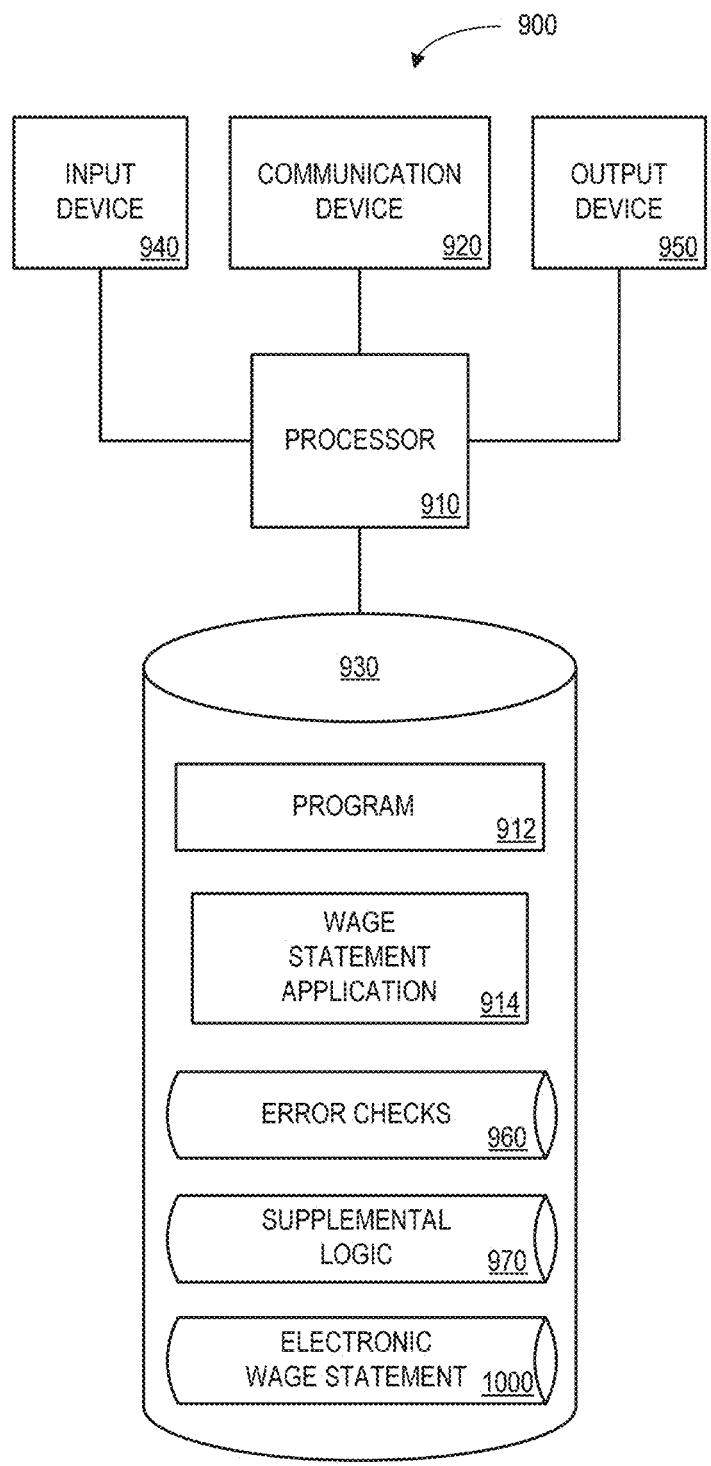
FIG. 9 is block diagram of a wage statement platform according to some embodiments of the present invention.

The embodiments described herein may be implemented using any number of different hardware configurations. For example, FIG. 9 illustrates a wage statement platform 900 that may be, for example, associated with the system 200 of FIG. 2. The wage statement platform 900 comprises a processor 910, such as one or more commercially available Central Processing Units (CPUs) in the form of one-chip microprocessors, coupled to a communication device 920 configured to communicate via a communication network (not shown in FIG. 9). The communication device 920 may be used to communicate, for example, with one or more remote devices. The wage statement platform 900 further includes an input device 940 (e.g., a mouse and/or keyboard to enter wage information or adjustments) and an output device 950 (e.g., a computer monitor to display a wage statement and/or file note).

The processor 910 also communicates with a storage device 930. The storage device 930 may comprise any appropriate information storage device, including combinations of magnetic storage devices (e.g., a hard disk drive), optical storage devices, mobile telephones, and/or semiconductor memory devices. The storage device 930 stores a program 912 and/or a wage statement application 914 (e.g., associated with a spreadsheet application and/or plug-in) for controlling the processor 910. The processor 910 performs instructions of the programs 912, 914, and thereby operates in accordance with any of the embodiments described herein. For example, the processor 910 may receive an indication of a pay period frequency from an insured along with an indication of an initial pay period begin date. A series of pay period begin date and pay period end date fields may then be automatically populated by the processor 910 based on the pay period frequency and initial pay period begin date. Wage values associated with a plurality of the pay period begin date and pay period end date fields may be received from the insured, and an electronic wage statement file may be generated by the processor based on the received wage values.

The programs 912, 914 may be stored in a compressed, uncompiled and/or encrypted format. The programs 912, 914 may furthermore include other program elements, such as an operating system, a database management system, and/or device drivers used by the processor 910 to interface with peripheral devices.

As used herein, information may be "received" by or "transmitted" to, for example: (i) the wage statement platform 900 from another device; or (ii) a software application or module within the wage statement platform 900 from another software application, module, or any other source.

In some embodiments (such as shown in FIG. 9), the storage device 930 stores an error check database 960 (e.g., with rules to help detect potentially inaccurate information), a supplemental logic database 970 (e.g., incorporating context-based rules to provide hints or supplemental questions for an insured), and an electronic wage statement database 1000. An example of a database that may be used in connection with the wage statement platform 900 will now be described in detail with respect to FIG. 10. Note that the database described herein is only one example, and additional and/or different information may be stored therein. Moreover, various databases might be split or combined in accordance with any of the embodiments described herein.

Referring to FIG. 10, a table is shown that represents the electronic wage statement database 1000 that may be stored at the wage statement platform 900 according to some embodiments. The table may include, for example, entries identifying pay periods for which an insured is providing wage information. The table may also define fields 1002, 1004, 1006, 1008, 1010 for each of the entries. The fields 1002, 1004, 1006, 1008, 1010, may, according to some embodiments, specify: a wage statement identifier 1002, a pay period 1004, an exclude indication 1006, wage values 1008, and gross wages 1010. The information in the electronic wage statement database 1000 may be created and updated, for example, based on information received from an insured or claim handler.

The wage statement identifier 1002 may be, for example, a unique alphanumeric code identifying a particular wage statement being submitted by an insured in connection with an insurance claim. The pay period 1004 might be automatically populated by a wage statement platform based on a pay period frequency and initial pay period begin date provided by an insured. The indication of exclusion 1006 might indicate, for example, whether a claim handler has decided that a particular pay period should (or should not) be included in a benefit calculation. The wage values 1008 may be provided by the insured and include, for example, numbers of hours worked and an hourly rate of pay. The gross wages 1010 might be automatically calculated by the wage statement platform and may be used, for example, to determine an appropriate average weekly wage for the insured.

Referring to FIG. 12, a portion of an exemplary structured data table 1205 is shown. Structured data table 1205 includes data type designations for rows in column 1210. Data type designations include dropdown values, including state dropdown, ascend/descend indicator, a frequency indicator, a used indicator and a calculate indicator. These dropdown values determine values of dropdown tables in displays for users. The data types also include data types indicative of rules applicable to states. These data types include overall period unit, numbers of units in an overall period, number of overall period units in days, overtime daily and weekly thresholds, and binary yes/no values for hourly rate, regular hours, a set of data fields and corresponding values for a particular state. In this example, the state is Illinois. The exemplary data includes threshold values for such items as overtime, whether hourly rates, regular hours, overtime hours, double time hours, scheduled days paid and scheduled days unpaid employed in calculations. These values may be employed in formulas for determining such data items as average weekly wage.

Certain fields identify thresholds, and have values of either hard or soft. A soft value indicates that if the threshold is breached, a warning is displayed, but processing may continue even if the values are not changed to bring the values within the threshold. A hard value indicates that processing will not continue until one or more values are changed to bring the values within the threshold. The exemplary fields include whether the date of hire is after the pay period start date, whether the date of loss is before the pay period stop date, and whether the pay period start date is more than 52 weeks prior to the date of loss.

Fields are provided for determining whether inputs can be provided on a user interface for the following data items: hourly rate, regular hours, overtime hours, double time hours, scheduled days paid, scheduled days unpaid, by way of example. A value of yes in one of the foregoing fields for a given state causes the system to provide an input field for a value. Thus, elements of a user interface are determined by certain fields of table 1205 and values of variables of those certain fields.

Referring to FIG. 13, a portion of an exemplary banner guidance/AWW (average weekly wage) calculation table 1305 is shown. In this table, values are provided for codes for employer and adjuster notes at 1310. In this area of the table, a state column and a display order column are provided, as well as a table providing for display of fields for input of free text by the employer or the adjuster. In the calculation and file note section of the table 1305, fields are provided on a state by state basis for determined average weekly wage.

Referring to FIG. 14, there is shown an exemplary state configuration table 1405. State configuration table 1405 is arranged with data fields in which each row corresponds to a single state or jurisdiction. State configuration table 1405 includes data categories including overall period rules 1420, overtime and double time state rules 1425. The overall period rules shown for selected states identify overall period units as weeks, years or das, the number of corresponding overall period units, the minimum number of days, and a frequency lock value. A frequency lock value is a binary value; if the frequency lock value is yes or positive, then the pay period frequency may not be changed by the user. If the frequency lock value is no or negative, then the user may select the pay period frequency. The overtime and double time state rules include thresholds for overtime hours per day, overtime hours per week, an overtime multiplier, and corresponding values for double time. The state configuration table 1405 further includes display controls 1430. Display controls 1430 include columns having binary yes/no data values for determination of display of data elements including hourly rate data, regular hours data, overtime hours and double time hours.

Embodiments of a state configuration table include a column with an indicator to determine whether to display, on a state-by-state basis, fields for entry of other items for inclusion in average weekly wage calculations. Exemplary other items may include tips received, as a dollar value, and miles driven.

Figure 15:
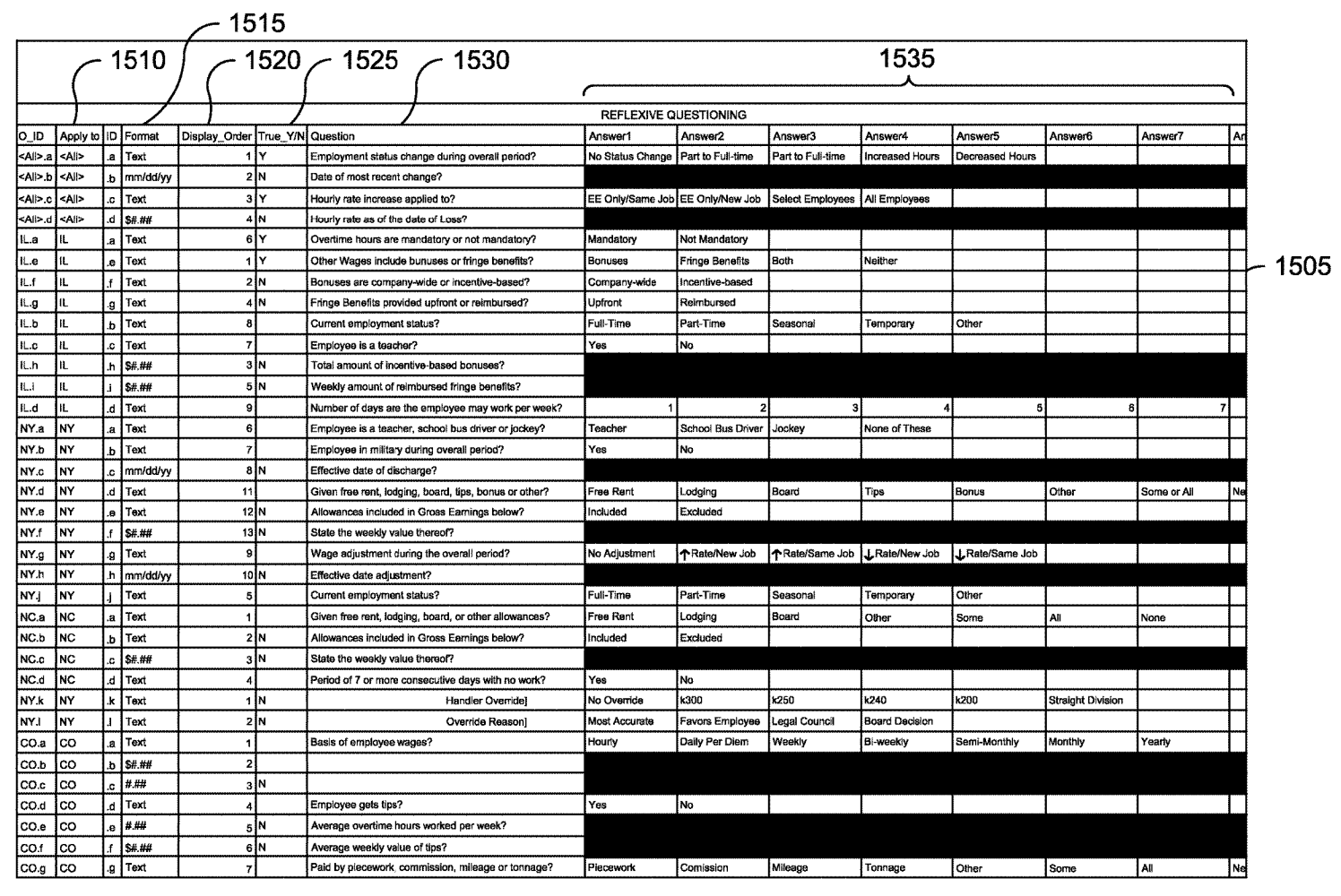

Referring now to FIG. 15, exemplary reflexive question table 1505 is shown. Reflexive question table 1505 provides for arrangement and storing of the text and logic of reflexive questions. The logic includes the arrangement of questions in a logic tree depending on responses to prior questions. Column 1510 has data values indicative of a jurisdiction to which a question or rule applies. Column 1515 has data values indicative of a data format, such as text or date formats, for a response to the question. Column 1520 provides a display order for the question. Column 1525 provides a binary indicator of Yes or No for certain questions. Column 1530 provides a text of a question for display. Answer columns 1535 provide available answers for display on a user interface. Thus, the reflexive question table includes numerous capabilities in the efficient form of a single spreadsheet table. The single table 1505 includes data indicative of a logic tree connecting questions dependent on answers as well as display format, jurisdiction selection, and data formats for responses.

Figure 16:
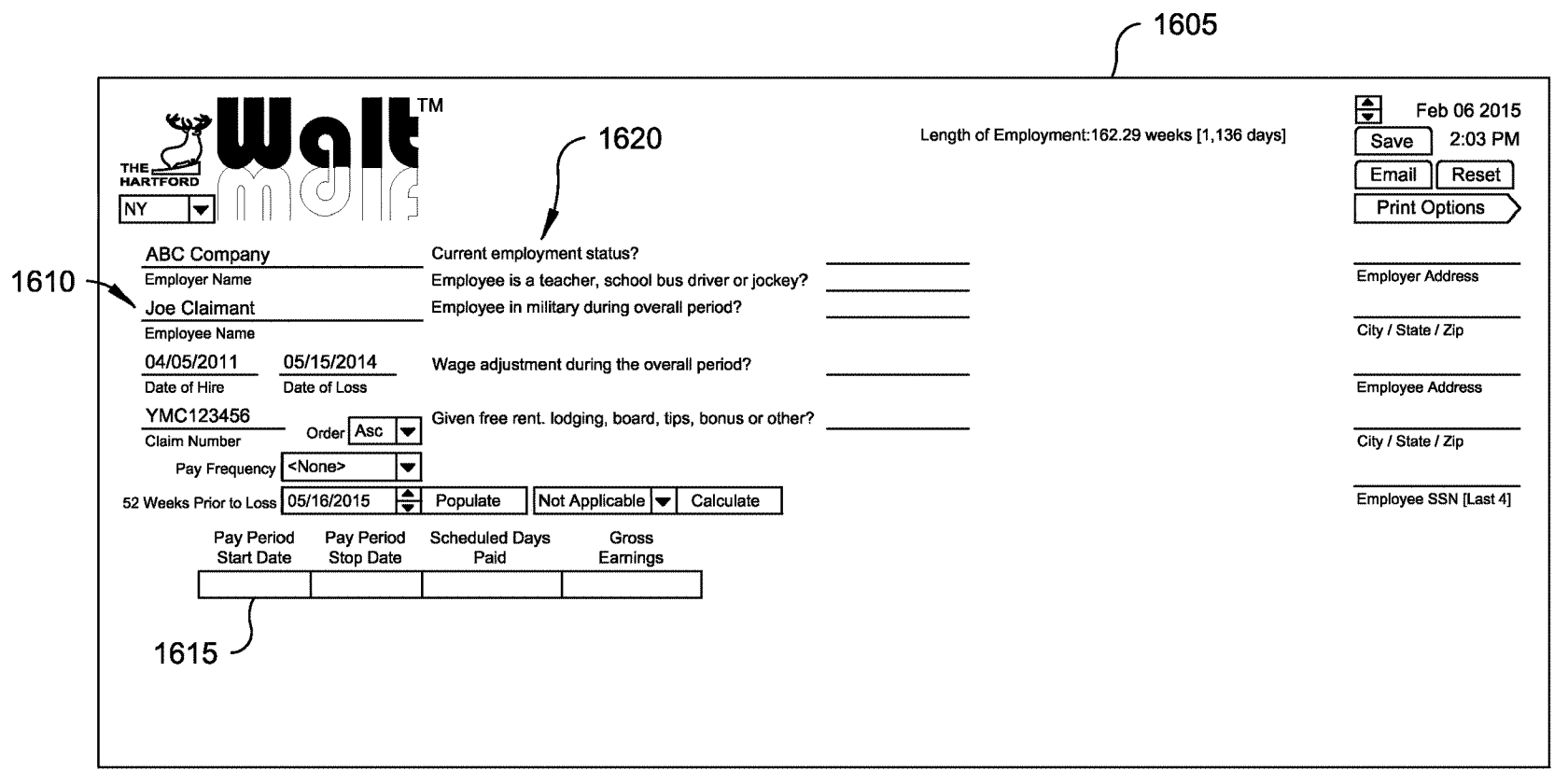

Referring now to FIG. 16, a user interface display 1605 generated by a system according to an embodiment is shown. User interface display 1605 is generated for use by an insured. In this display, certain fields 1610, including employer name, employee name, date of hire, date of loss, and claim number, are filled. Fields 1615 are displayed for pay period start date, pay period stop date and scheduled days paid to be input. The system has generated reflexive questions 1620 in accordance with instructions from reflexive question table 1505.

Figure 17:
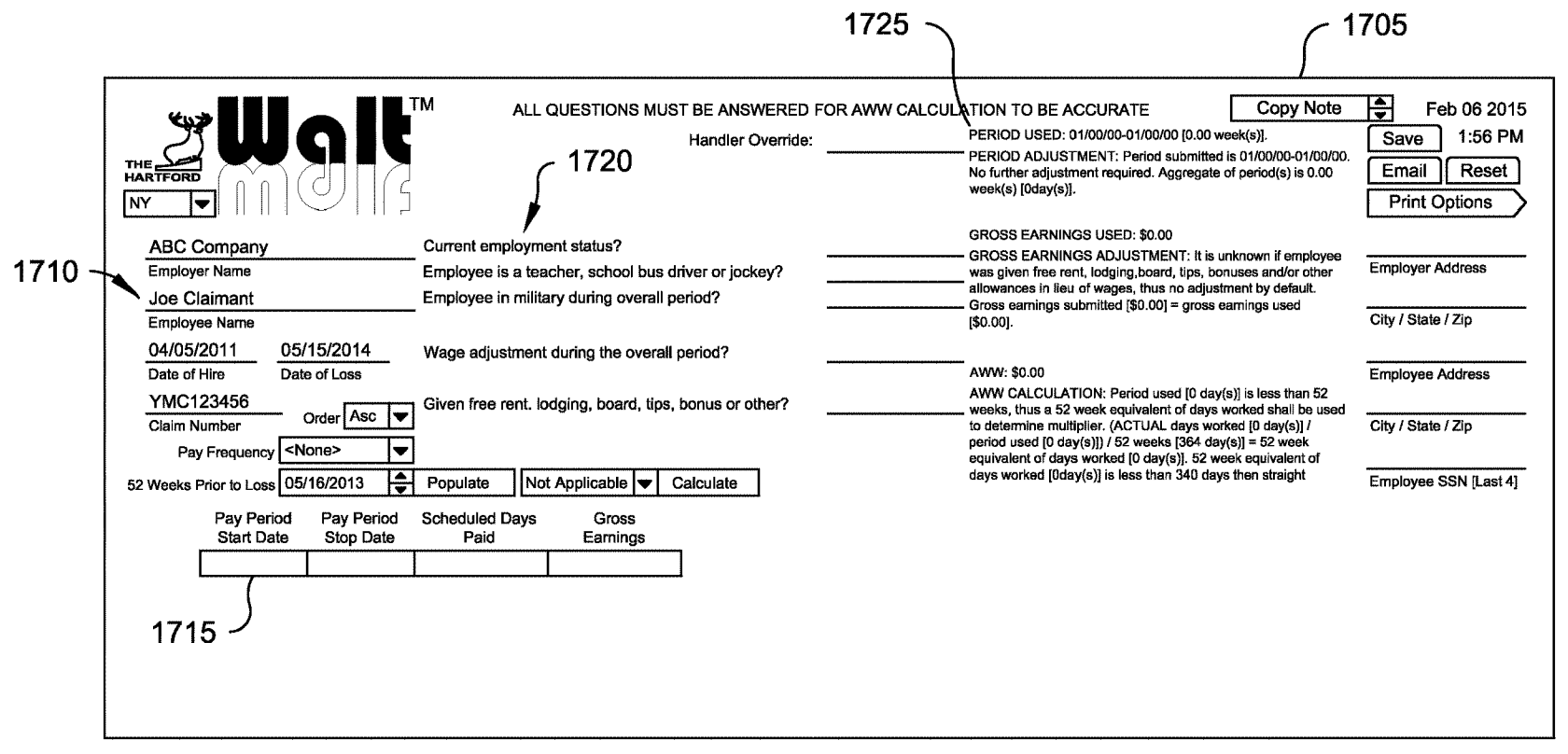

Referring now to FIG. 17, a user interface display 1705 generated by a system according to an embodiment is shown. User interface display 1705 is generated for use by a claim handler. Fields 1710 are pre-filled with data relevant to a claim. Pay period date fields 1715 are available. Reflexive questions 1720 have been generated and displayed in accordance with instructions contained in reflexive question table 1505. Note fields 1725, having text and data in accordance with instructions from one or more tables, are displayed.

Figure 18:
FIG. 18 illustrates a user interface display including display of reflexive questions and responses in accordance with some embodiments.

Referring now to FIG. 18, a user interface display 1805 generated by a system according to an embodiment is shown. User interface display 1805 is generated by the system in response to user input of responses to reflexive questions in the user interface display 1705. User interface display shows 1805 shows completed answers 1825 to reflexive questions, in accordance with options from answer columns 1535 of table 1505 of FIG. 15. In user interface display 1805, notes fields 1830 have been completed by the handler and input data is displayed.

Figure 19:
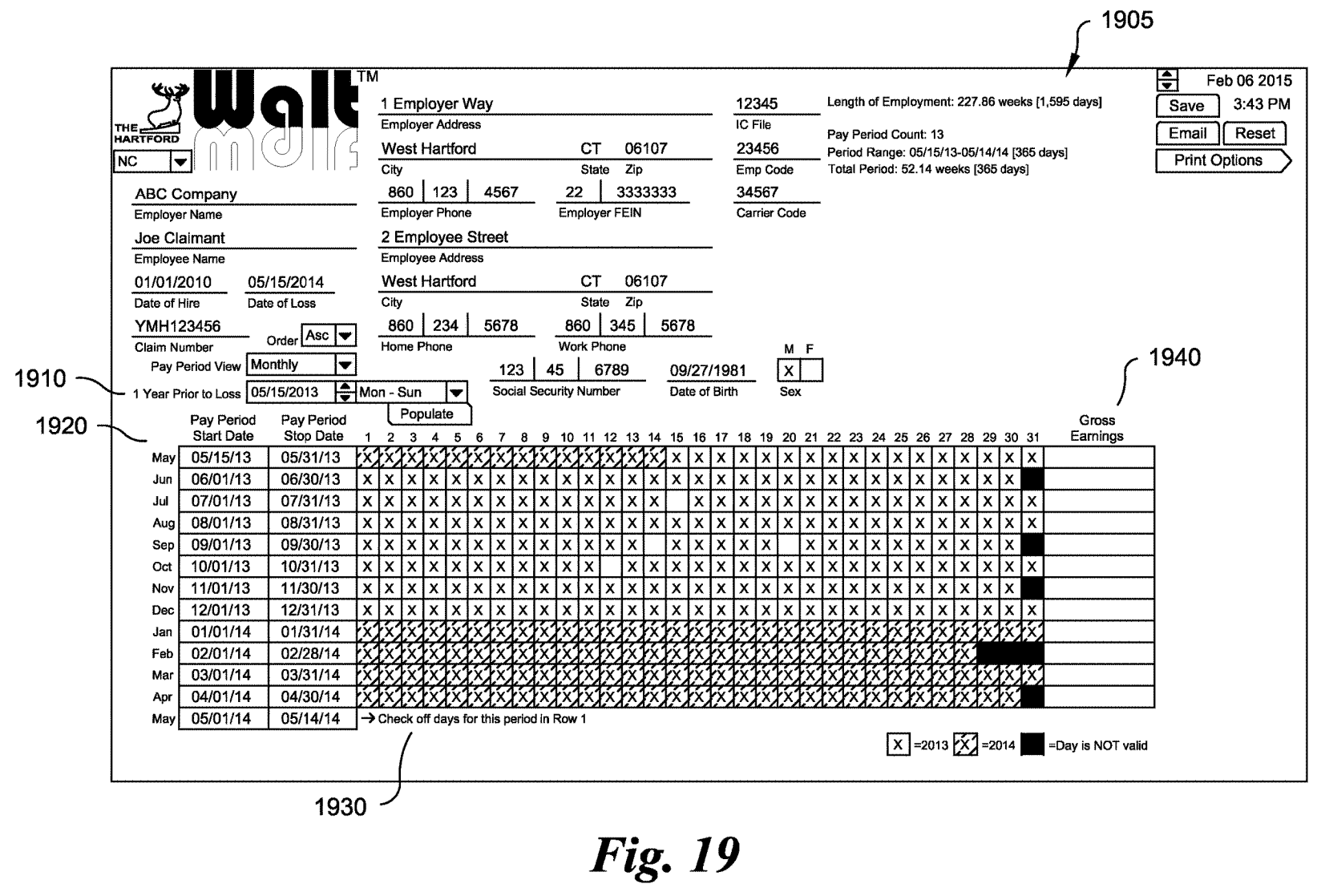

Referring now to FIG. 19, a user interface display 1905 is shown, including generation of pay periods and associated data in accordance with jurisdictional requirements. The system has displayed a date of one year prior to the date of loss, at 1910, and automatically generated monthly pay periods at 1920. First and last pay periods are partial. The system has also determined and displayed each valid date of each of the pay periods in the matrix 1930. In at least North Carolina, such a matrix is required to be shown in a submitted form for workers compensation compliance. Gross earnings column 1940 will display a gross earnings value, based on input rates and hours worked, and subject to error checking.

Referring now to FIG. 20, a user interface display 2005 is shown, including a table populated with calculated pay period stop and start dates, at 2010, user input data at 2020 including, for each pay period, hourly rate, regular hours, overtime hours, scheduled days paid, scheduled days unpaid and other wages, and system-calculated gross earnings 2030, using formulas incorporated in one or more spreadsheet tables, for each pay period. Based on the determined pay period gross earnings, the system, using formulas incorporated in one or more spreadsheet tables, may calculate an average weekly wage value.

Figure 21:
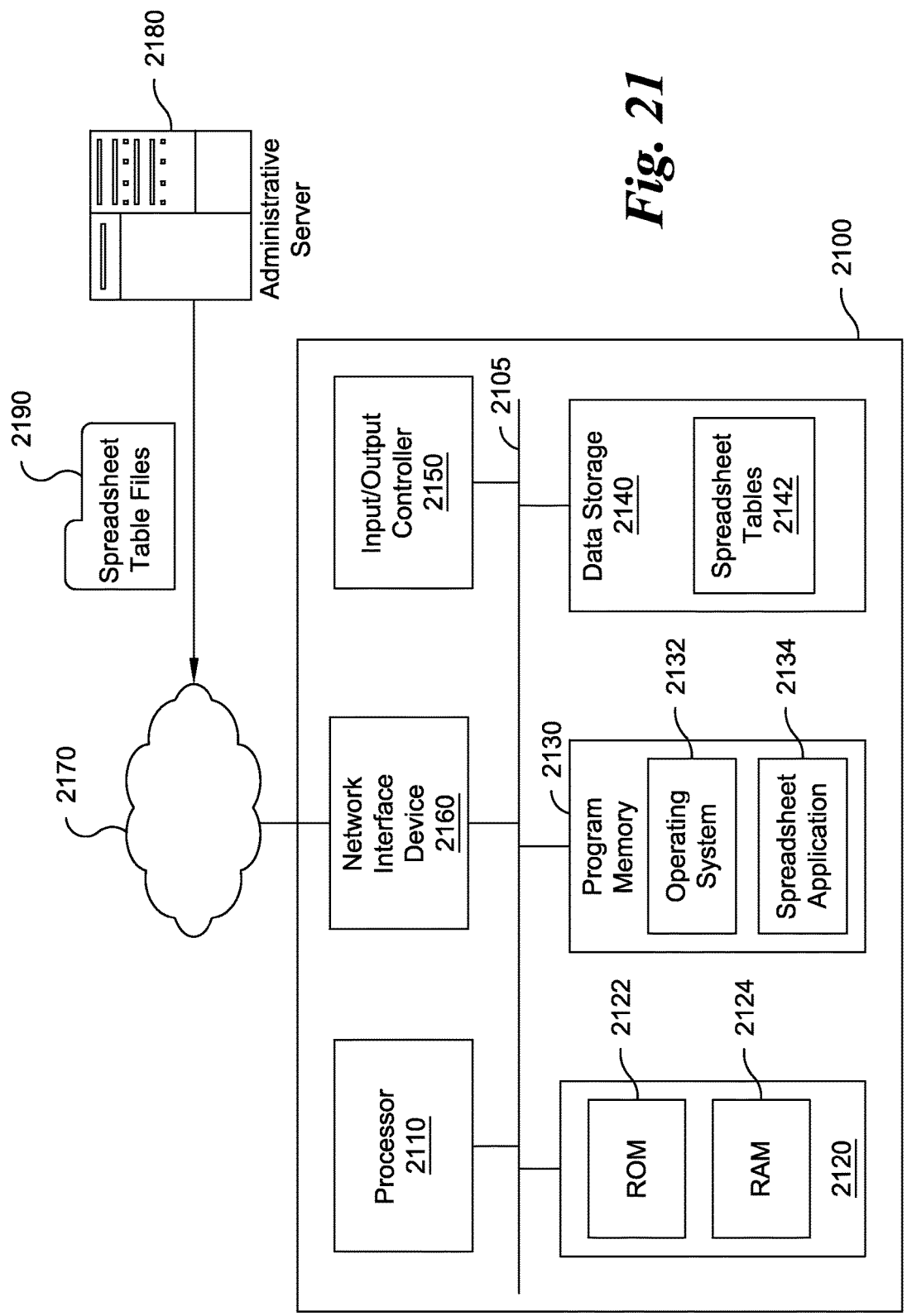
FIG. 21 is a block diagram of a computer system according to some embodiments.

Referring now to FIG. 21, there is shown a computer system 2100 according to an embodiment. Computer system 2100 may be embodied in any suitable arrangement, such as a desktop, laptop, tablet, smart phone, personal digital assistant, or other type of device. Computer system 2100 includes bus 2105 providing two-way data communication among hardware components. Processor 2110 may include one or more microprocessors integrated in a central processing unit for performing calculations. Local memory 2120 includes read only memory 2122 and random access memory 2124 in communication with processor 2110. Program memory 2130 includes operating system files 2132 and spreadsheet application program files 2134, as examples of stored executable programs. Data storage 2140 includes spreadsheet tables 2142, such as tables illustrated in FIGS. 12-15. Data storage may include any suitable type of memory storage device. The embodying of data for generating user interfaces and logic in spreadsheet tables 2142 provides for more efficient use of physical memory space in memory storage devices 2140 than other alternatives, such as a standalone application program not implemented by a spreadsheet application. Input/output controller 2150 interconnects with input and output devices, such as keyboards, mice, touch screens, display controllers and displays, and audio components such as speakers and microphones for display of user interfaces and receipt of data via user interfaces. Network interface device 2160 enables bi-directional communication with wired and wireless networks, such as network (which may be or include the Internet) 2170. Administrative server 2180 is illustrated as a source of spreadsheet table files 2190 which may be transmitted, via network 2170, such as via e-mail as an attachment, via ftp or other protocol, or otherwise, with use of less bandwidth than other alternative formats for the display and calculation logic.

Figure 22:
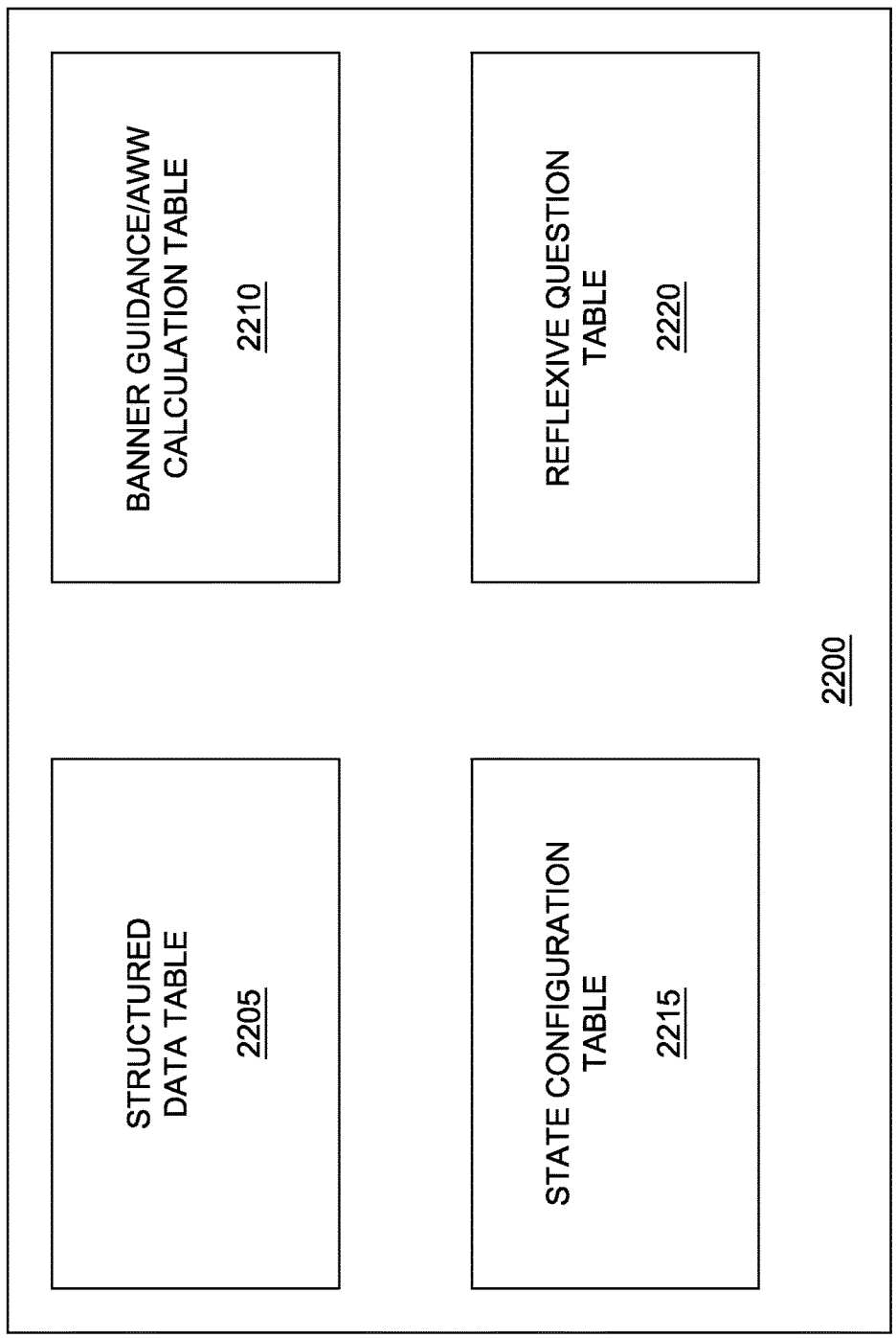
FIG. 22 shows a block diagram of interrelated tables, such as the tables of FIGS. 12-15, in a spreadsheet implemented embodiment.

Referring to FIG. 22, a diagram is shown of interrelated tables, such as the tables of FIGS. 12-15, in a spread-sheet implemented embodiment. Structured data table 2205, banner guidance/AWW calculation table 2210, state configuration table 2215 and reflexive question table 2220 are shown. Structured data table 2205 includes data arranged by state, such as units, such as weeks or days, employed in calculations, threshold data, categories of hours worked employed in a calculation, and other data. Banner guidance/AWW calculation table 2210 provides display order for banner text and stores calculation results. State configuration table 2215 provides state rules and display controls arranged by state. Reflexive question table 2220 includes question text and rules for reflexive questions required for each state. The tables include references to cells in one another, thereby facilitating use of rules and calculations set forth in multiple tables in connection with generation of user interface displays and calculations of values.

Figure 23A:
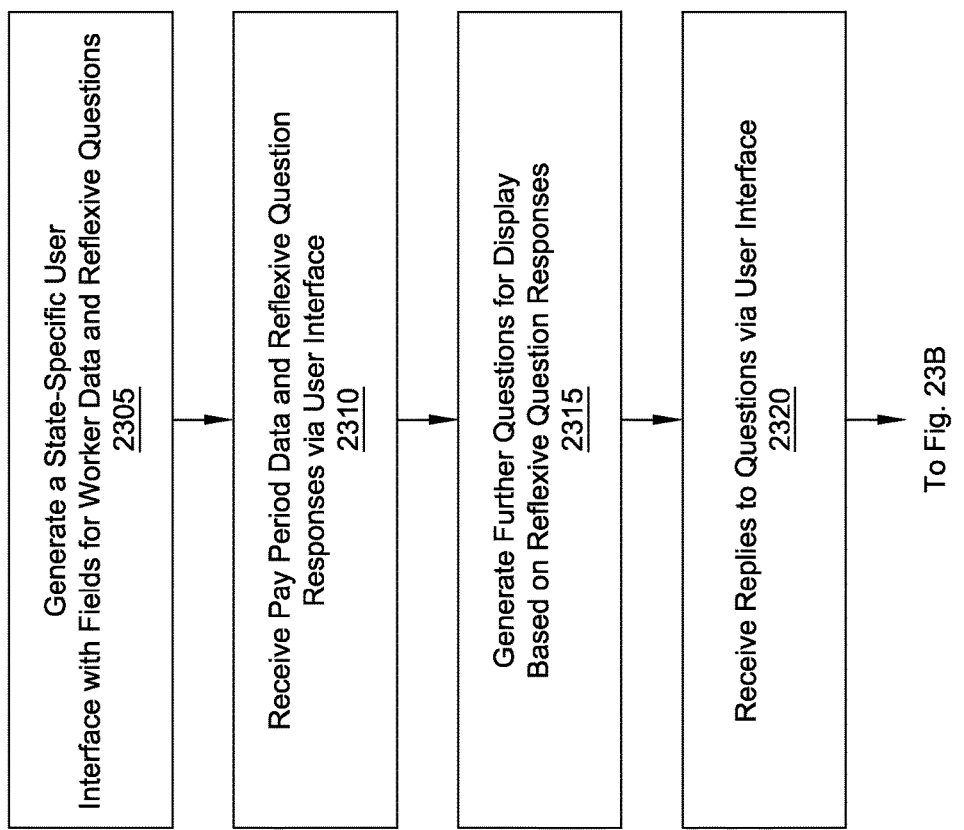
Figure 23B:
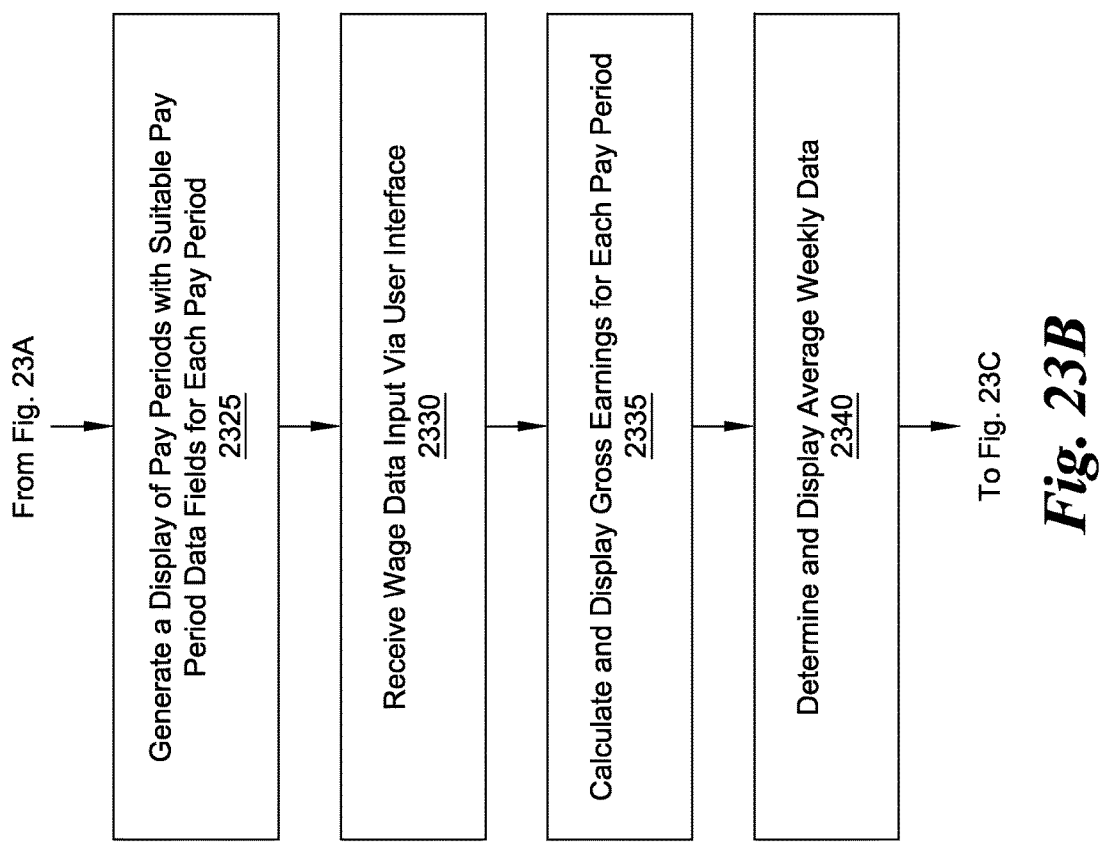

Referring to FIG. 23, a process flow diagram of a process performed, such as by system 2100, is shown. The system may generate 2305 a user interface with fields for input specific to a particular jurisdiction. The input fields may include fields for input of pay period data, such as frequency (such as by selection of weekly, bi-weekly, semi-monthly or enter manually from a drop down menu) and begin and end dates, and inputs for fields of responses to reflexive questions. The system then receives 2310 the pay period data and responses to reflexive questions via the user interface. Based on the responses, the system may generate 2315 further questions for display along with response fields for questions, in accordance with instructions embodied, for example, in a reflexive question table. The system may then receive 2320 replies to the further questions via the user interface. The system may then generate 2325 a display of pay periods with suitable pay period data fields for each pay period. The pay period determination may be based on application of state specific rules, such as whether a date of loss may be after the last pay period stop date, or other rules shown in FIG. 12, by way of example. The data fields may be determined based on state rules and replies to reflexive questions. The fields may include fields for such data as scheduled days paid, gross earnings, hourly rate, regular hours, overtime hours, double time hours, mileage reimbursed, tips and other wages, by way of example. The system may then receive 2330 wage data input in the displayed fields, such as in response to a user selection of a displayed command button, labeled, e.g., "calculate," on the user interface. The system on receipt of the data may then calculate and display 2335 the gross earnings for each of the displayed pay periods. The calculation of gross earnings may include use of values in fields in the system indicative of state specific rules, such as rules as to maximum amount of overtime, maximum wage rates used for calculation of workers compensation benefits, and other rules. Thus, the calculation of gross earnings for a given pay period may be based on a simple multiplication of hours by hourly rate, or may be based on more involved calculations.

The system then continues to determine and display 2340 average weekly wage data. The determination of average weekly wage may be based on a formula, such as a sum of gross earnings, divided by a number of days worked, then multiplied by a factor, such as 260 (for 5-day work week) or 300 (for a 6-day work week).

The system may cause to display 2345 on the user interface a user option to generate a state form. The state form may be formatted in accordance with state requirements and include required data such as determined average weekly wage, pay periods, gross earnings, employer data, injured worker data, and other data. The formatting may be provided in accordance with stored instructions, which may be embodied in spreadsheet tables. The system may receive 2350 a user request to generate a state form formatted in accordance with requirements of a particular state and populated with data relating to a particular injured worker, and then generate 2355 a suitable printable electronic file, in a suitable format such as pdf, for printing.

Figure 24:
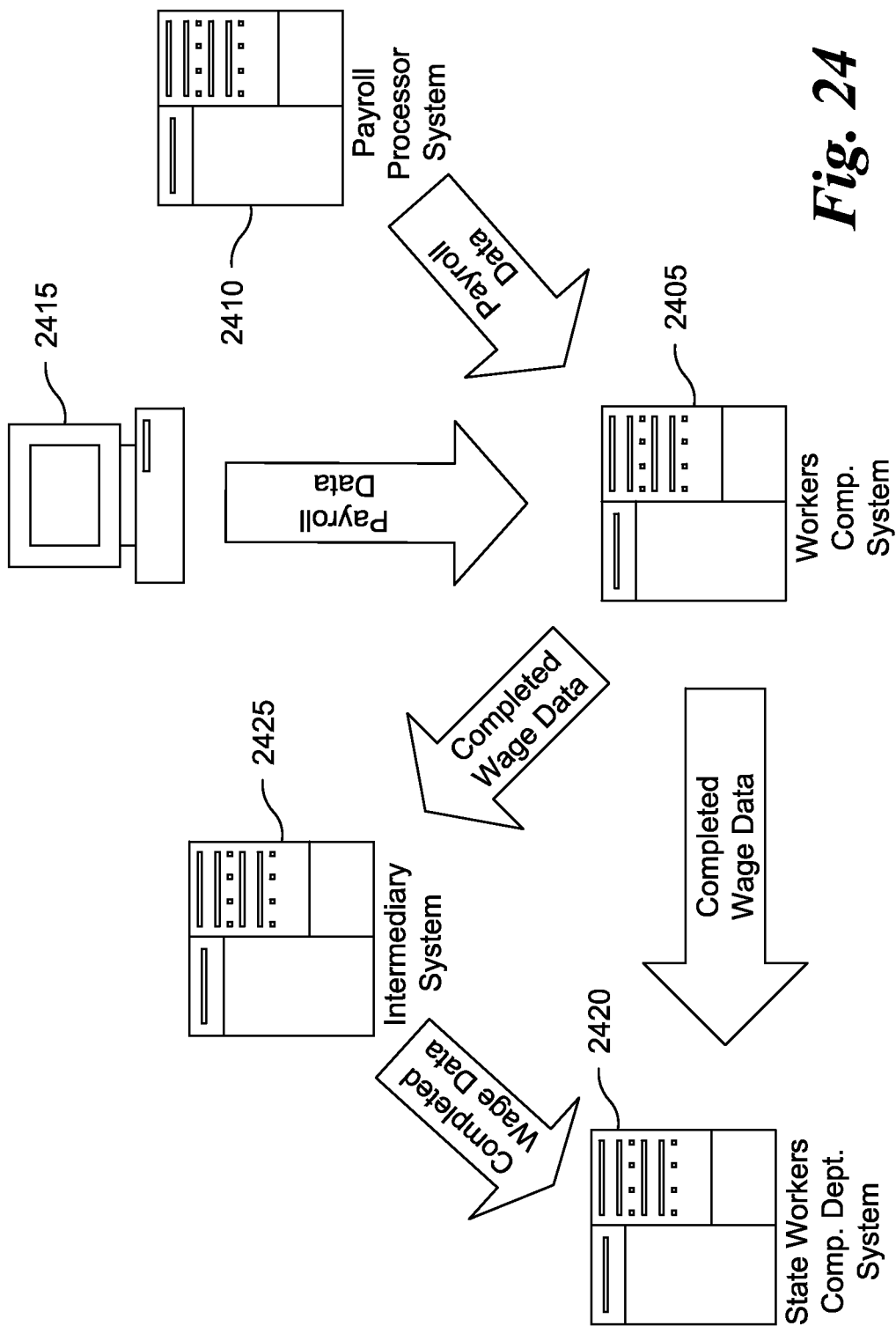
FIG. 24 shows a system diagram with data flows according to some embodiments.

Referring now to FIG. 24, an environment in which a computer system according to an embodiment is in communication with other systems. Computer system 2405 is configured to receive payroll data from sources such as third party payroll processor system 2410 and employer computer system 2415. Computer system 2405 uses payroll data to perform determinations of average weekly wage, complete forms and other determinations and processes described here. In these embodiments, computer system 2405 may execute instructions to access received data files. Computer system 2405 furnishes data indicative of average weekly wage, completed state forms, wage and related data, and the like, directly to state workers compensation department computer system 2420. In embodiments, the data may be furnished via a third party such as agent or intermediary computer system 2425.

Data communication may be by periodic upload, e.g., via a tool installed on an employer or payroll processor computer system that accesses relevant data from local databases or data tables stored by payroll processing software such as Quickbooks and provides the data to system 2405. Advantageously, such a tool, may be implemented in small file size, saving memory resources at the employer or payroll processing system. It will be appreciated that a tool that performs processes of data extraction has lower memory requirements than a tool that performs more extensive processing. In embodiments, data may be distributed via ftp protocols, In embodiments, the functionality of computer system 2405 may be implemented in whole or in part by one or more of third party payroll processor system 2410, employer computer system 2415, and intermediary computer system 2420. For example, suitable spreadsheet tables may be distributed and stored on one or more such systems and configured to perform processing at the employer, third party payroll processor or intermediary computer system site.

Thus, some embodiments may provide improved benefit calculations and reduce financial inaccuracies (and associated penalties, including accrued interest). In addition, the electronic wage statement files may be transparent and limits areas of confusion for auditors.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the databases described herein may be combined or stored in external systems).

Figure 11:
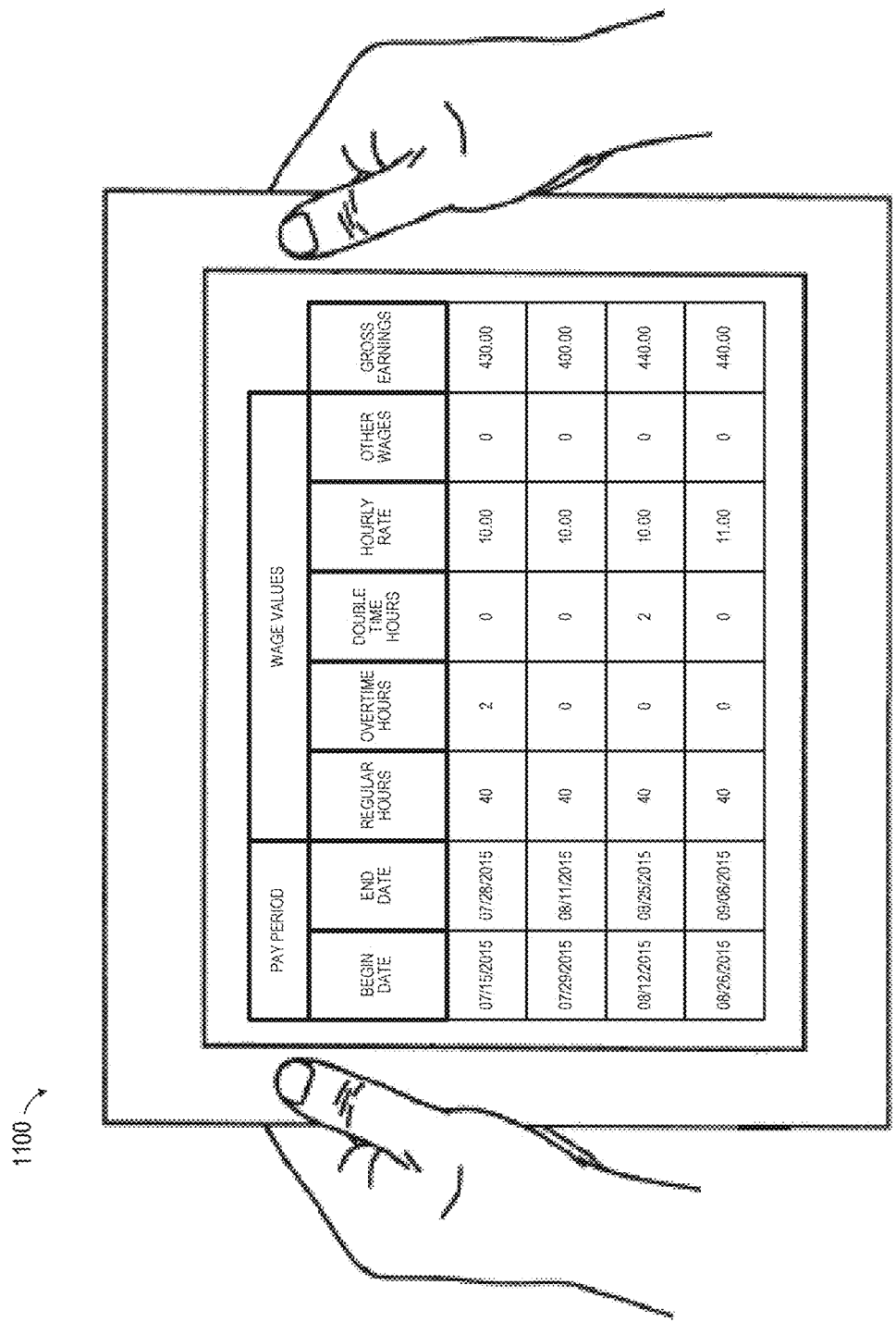
FIG. 11 illustrates a display in accordance with some embodiments described herein.

Moreover, some embodiments have been described herein as being accessed via a PC or laptop computer. Note, however, that embodiments may be implemented using any device capable of executing the disclosed functions and steps. For example, FIG. 11 illustrates a display 1100 in accordance with some embodiments described herein. In particular, the display 1100 includes a graphical user interface including information about an electronic wage statement file displayed via a tablet computer or smart phone in accordance with any of the embodiments described herein. The tablet or smart phone may be running a local spreadsheet program using a file including tables as described herein, another local application program, or be in client-server mode. If a smart phone in client-server mode, the system may be configured for preferential use of wi-fi networks over cellular data networks.

Further, some embodiments have been described herein as being used to facilitate workers' compensation benefits. Note, however, that the techniques described herein might be used in connection with other types of benefits. For example, average weekly wage rates might be associated with temporary total disability payments and/or other types of supplemental insurance products and services.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

A system for communication with employers, employees, claim handlers and others may include a printing system including a plurality of printers for printing documents including determinations of average weekly wage and associated data, such as employer data, employee data, relevant dates, and other data. Systems for printing, folding, envelope stuffing and application of postage using automated postage meters may be employed, supplied by Neopost or other vendors.

As used herein, the term "processor" broadly refers to and is not limited to a single- or multi-core general purpose processor, a special purpose processor, a conventional processor, a Graphics Processing Unit (GPU), a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), a system-on-a-chip (SOC), and/or a state machine. In embodiments, processing speed may be enhanced by providing one or more co-processors, such as math co-processors, or other designated processors of a multi-processor chipset, to execute computational steps associated with calculations implemented by embodiments of the present system, while other functions of the computer system are carried out by a central processor. By way of example, steps associated with generation of user interface displays and steps associated with formatting data for printing may be carried out by the central processor. In other embodiments, calculations associated with generating user interfaces may be configured to be executed by display processors, while other functions, such as calculations, are carried out by a central processor.

In other embodiments, one or more public cloud, private cloud, hybrid cloud and cloud-like networks may also be implemented, for example, to handle and conduct processing of one or more transactions or processing of the present invention. Cloud based computing may be used herein to handle any one or more of the application, storage and connectivity requirements of the present invention. For example one or more private clouds may be implemented to handle generation of user interfaces to prompt for employer data, injured worker data, claim data and wage data, and perform determinations of user interface displays and reflexive questions for display, as well as calculation of gross weekly wages and average weekly wages, and related data processing requirements. Furthermore, any suitable data and communication protocols may be employed to accomplish the teachings of the present invention.

Advantageously, the present system may be implemented in a client server or application service provider environment. As a result of the compact file size and related data storage requirements associated with embodiments, such as the spreadsheet table embodiment, lower data storage requirements are achieved using the disclosed embodiments than embodiments in which a standalone program is provided, and thus advantages are achieved as to storage in client server, application service provider and cloud based embodiments.

The flow charts described herein do not imply a fixed order to the steps, and embodiments of the present invention may be practiced in any order that is practicable. In embodiments, one or more steps of the methods may be omitted, and one or more additional steps interpolated between described steps. Note that any of the methods described herein may be performed by hardware, software, or any combination of these approaches. For example, a non-transitory computer-readable storage medium may store thereon instructions that when executed by one or more processors result in performance according to any of the embodiments described herein. In embodiments, each of the steps of the methods may be performed by a single computer processor or CPU, or performance of the steps may be distributed among two or more computer processors or CPU's of two or more computer systems.

The embodiments described herein are solely for the purpose of illustration. Those in the art will recognize that other embodiments may be practiced with modifications and alterations limited only by the claims.

What is claimed is:

1. A computer system for efficient processing of rules-based data input via one or more user interfaces for determination of workers compensation benefits, comprising:

a memory device storing computer-readable instructions, which instructions, when executed by one or more processors executing a spreadsheet application program, cause the one or more processors to:

generate a user interface display comprising prompts for data indicative of responses to one or more questions, claim data and injured worker data, the one or more questions being determined based on an applicable jurisdiction;

based in part on responses to the one or more questions, generate prompts for input of responses to further questions and payroll date information;

generate a display of payroll periods, based at least in part on the claim data and payroll date information, with prompts for input of wage data for the injured worker;

receive user inputs of wage data;

based on the received user inputs, via formulas embodied in the instructions, generate pay period gross wage data for the injured worker;

based on the generated gross wage data, determine average weekly wage data for the injured worker; and responsive to determination of the average weekly wage data, generate a formatted state form incorporating the determined average weekly wage data for the injured worker;

wherein the instructions comprise at least a first computer-readable file defining a plurality of spreadsheet tables, having internal references, and the instructions embodied in one of the spreadsheet tables comprise rules, arranged by state in rows or columns, defining overall period units, a frequency lock value for the overall period units, and display controls for display of data elements comprising hourly rate data, regular hours data, overtime hours, and double time hours, operable to provide for updates to a single one of the spreadsheet tables responsive to a change in a rule in any state, and a single one of the spreadsheet tables includes rules operative for differentially configuring user interfaces for different jurisdictions;

the instructions further comprising a reflexive question table, defined by a single spreadsheet table including data defining a logic tree connecting questions dependent on answers, jurisdictions to which a question is applicable, texts of questions for display and display formats for responses.

2. The computer system of claim 1, wherein the instructions comprise data in tabular form of question order, question text and available answers.

3. The computer system of claim 1, wherein the instructions comprise instructions for automated determination and display of pay period begin and end dates.

4. The computer system of claim 1, wherein the instructions include instructions for calculation of overtime compensation amounts.

5. The computer system of claim 1, wherein the instructions comprise instructions for determination of overall period units and numbers of overall period units.

6. The computer system of claim 1, wherein the instructions comprise instructions for determination of pay period begin and end dates based on any of weekly, bi-weekly, semi-monthly and monthly periods.

7. A computer-implemented method for efficient processing of rules-based data input via a plurality of user interfaces, comprising:

generating, by one or more processors executing a spreadsheet application program, accessing at least one computer-readable file defining a plurality of spreadsheet tables, a user interface display comprising prompts for data indicative of jurisdiction and employee data;

receiving, via the user interface, user inputs of data indicative of jurisdiction and employee data;

based on the received user inputs, via formulas embodied in one or more of the plurality of spreadsheet tables, determining, by the one or more processors executing the spreadsheet application program and accessing the plurality of spreadsheet tables, a plurality of pay periods, and prompting the user for wage information for each of the pay periods;

determining, based on received wage information, gross wage amounts for each of the pay periods;

based on the gross wage amounts, determining average weekly wage data, and generating a formatted state form incorporating the determined average weekly wage data;

wherein the at least one computer-readable file defines a plurality of spreadsheet tables, having internal references, and one of the spreadsheet tables includes rules, arranged by state in rows or columns, defining overall period units, a frequency lock value for the overall period units, and display controls for display of data elements comprising hourly rate data, regular hours data, overtime hours, and double time hours, operable to provide for updates to a single spreadsheet table responsive to a change in a rule in any state, and a single one of the spreadsheet tables includes rules operative for differentially configuring user interfaces for different jurisdictions;

wherein the at least one computer-readable file further comprises a reflexive question table, defined by a single spreadsheet table including data defining a logic tree connecting questions dependent on answers, jurisdictions to which a question is applicable, texts of questions for display, and display formats for responses.

8. The computer-implemented method of claim 7, further comprising calculation of overtime compensation amounts in accordance with values embodied in one or more of the spreadsheet tables.

9. The computer-implemented method of claim 7, further comprising, based on instructions embodied in one or more of the spreadsheet tables, determining of overall period units and numbers of overall period units.

10. The computer-implemented method of claim 7, further comprising, based on instructions embodied in one or more of the spreadsheet tables, generating a plurality of reflexive questions in a question order, and available answers.

11. A non-transitory computer-readable medium having stored computer-readable instructions, in a spreadsheet format, comprising a plurality of spreadsheet tables, having internal references, which instructions, when executed by one or more processors executing a spreadsheet application program, cause the one or more processors to:

receive inputs of jurisdiction and employee data;

responsive to the inputs, generate displays of one or more questions;

based on jurisdiction and responses, determine a plurality of pay periods, and generate displays of prompts for employee wage data for each of the pay periods;

receive employee wage data, and generate gross wage data based on the received wage data;

based on the gross wage data, determine average weekly wage data; and responsive to determination of the average weekly wage data, generate a formatted state form incorporating the determined average weekly wage data;

wherein one of the spreadsheet tables includes rules, arranged by state in rows or columns, defining overall period units, a frequency lock value for the overall period units, and display controls for display of data elements comprising hourly rate data, regular hours data, overtime hours, and double time hours, operable to provide for updates to a single spreadsheet table responsive to a change in a rule in any state, and a single one of the spreadsheet tables includes rules operative for differentially configuring user interfaces for different jurisdictions;

the plurality of spreadsheet tables further comprising a reflexive question table, defined by a single spreadsheet table including data defining a logic tree connecting questions dependent on answers, jurisdictions to which a question is applicable, texts of questions for display and display formats for responses.

12. The non-transitory computer-readable medium of claim 11, wherein the instructions embodied in one or more of the spreadsheet tables include instructions for calculation of overtime compensation amounts.

13. The non-transitory computer-readable medium of claim 11, wherein the instructions comprise data in tabular form of question order, question text and available answers.

* * * * *